(12) United States Patent
Galit et al.

(10) Patent No.: US 8,108,279 B2
(45) Date of Patent: Jan. 31, 2012

(54) COMPUTER-IMPLEMENTED METHODS, PROGRAM PRODUCT, AND SYSTEM TO ENHANCE BANKING TERMS OVER TIME

(75) Inventors: Scott Galit, New York, NY (US); Trent Sorbe, Brookings, SD (US)

(73) Assignee: Metabank, Sioux Falls, SD (US)

( * ) Notice: Subject to any disclaimer, the term of this patent is extended or adjusted under 35 U.S.C. 154(b) by 525 days.

(21) Appl. No.: 12/338,712

(22) Filed: Dec. 18, 2008

(65) Prior Publication Data

US 2009/0164364 A1 Jun. 25, 2009

Related U.S. Application Data

(60) Provisional application No. 61/016,213, filed on Dec. 21, 2007, provisional application No. 61/052,454, filed on May 12, 2008, provisional application No. 61/029,975, filed on Feb. 20, 2008, provisional application No. 61/042,612, filed on Apr. 4, 2008, provisional application No. 61/042,624, filed on Apr. 4, 2008, provisional application No. 61/032,750, filed on Feb. 29, 2008, provisional application No. 61/060,559, filed on Jun. 11, 2008, provisional application No. 61/082,863, filed on Jul. 23, 2008, provisional application No. 61/053,056, filed on May 14, 2008.

(51) Int. Cl.
*G06Q 40/00* (2012.01)
(52) U.S. Cl. ....................................... 705/35
(58) Field of Classification Search ............... 705/35
See application file for complete search history.

(56) References Cited

U.S. PATENT DOCUMENTS

| | | | |
|---|---|---|---|
| 3,752,904 | A | 8/1973 | Waterbury |
| 4,247,759 | A | 1/1981 | Yuris et al. |
| 4,334,307 | A | 6/1982 | Bourgeois et al. |
| 4,439,636 | A | 3/1984 | Newkirk et al. |
| 4,449,040 | A | 5/1984 | Matsuoka et al. |
| 4,528,643 | A | 7/1985 | Freeny, Jr. |

(Continued)

FOREIGN PATENT DOCUMENTS

EP 0348932 1/1990
(Continued)

OTHER PUBLICATIONS

Jane Boon Pearlstine, Lenders, Borrowers Hook Up Over the Web: Prosper.com and Other Sites Provide Forum for Individual Bidders Willing to Offer Small Loans, Wall Street Journal, May 20, 2006.

(Continued)

*Primary Examiner* — Eric T Wong
(74) *Attorney, Agent, or Firm* — Bracewell & Giuliani LLP

(57) ABSTRACT

Managing access to a line of credit, for example, can include a financial institution computer determining eligibility for a line of credit program responsive to a consumer's prior enrollment in a prepaid card program and one or more of the following: the consumer's historical direct deposit data, and data associated with the consumer's historical behavior in the prepaid card program. The financial institution computer can extend an amount of available credit to the consumer through the line of credit program so that a consumer credit limit is capped through underwriting criteria to ensure that no more than a predetermined percentage of a consumer's historic direct deposit amount is required for minimum repayments. The financial institution computer can farther receive loan repayments over one or more predetermined direct deposit periods and change the consumer credit limit by preselected increments responsive to a change in the consumer's direct deposit amount.

20 Claims, 7 Drawing Sheets

U.S. PATENT DOCUMENTS

| | | |
|---|---|---|
| 4,532,416 A | 7/1985 | Berstein |
| 4,577,061 A | 3/1986 | Katzaff et al. |
| 4,625,276 A | 11/1986 | Benton et al. |
| 4,677,565 A | 6/1987 | Ogaki et al. |
| 4,678,895 A | 7/1987 | Tateisi et al. |
| 4,706,275 A | 11/1987 | Kamal |
| 4,722,054 A | 1/1988 | Yorozu et al. |
| 4,727,243 A | 2/1988 | Saver |
| 4,750,201 A | 6/1988 | Hodgson et al. |
| 4,797,540 A | 1/1989 | Kimizu |
| 4,827,113 A | 5/1989 | Rikuna |
| 4,868,900 A | 9/1989 | McGuire |
| 4,877,947 A | 10/1989 | Mori |
| 4,879,744 A | 11/1989 | Tasaki et al. |
| 4,884,212 A | 11/1989 | Stutsman |
| 4,951,308 A | 8/1990 | Bishop et al. |
| 4,968,873 A | 11/1990 | Dethloff et al. |
| 5,012,077 A | 4/1991 | Takano |
| 5,048,085 A | 9/1991 | Abraham et al. |
| 5,050,207 A | 9/1991 | Hitchcock |
| 5,068,891 A | 11/1991 | Marshall |
| 5,101,098 A | 3/1992 | Naito |
| 5,138,650 A | 8/1992 | Stahl et al. |
| 5,146,067 A | 9/1992 | Sloan et al. |
| 5,148,481 A | 9/1992 | Abraham et al. |
| 5,155,342 A | 10/1992 | Urano |
| 5,163,086 A | 11/1992 | Ahearn et al. |
| 5,192,947 A | 3/1993 | Neustein |
| 5,220,593 A | 6/1993 | Zicker et al. |
| 5,221,838 A | 6/1993 | Gutman et al. |
| 5,225,666 A | 7/1993 | Amarena et al. |
| 5,264,689 A | 11/1993 | Maes et al. |
| 5,265,155 A | 11/1993 | Castro |
| 5,266,782 A | 11/1993 | Alanara et al. |
| 5,272,320 A | 12/1993 | Hakamada |
| 5,278,752 A | 1/1994 | Narita et al. |
| 5,285,382 A | 2/1994 | Muehlberger et al. |
| 5,327,482 A | 7/1994 | Yamamoto |
| 5,334,821 A | 8/1994 | Campo et al. |
| 5,340,969 A | 8/1994 | Cox |
| 5,352,876 A | 10/1994 | Watanabe et al. |
| 5,359,182 A | 10/1994 | Schiling |
| 5,409,092 A | 4/1995 | Itako et al. |
| 5,416,306 A | 5/1995 | Imahata |
| 5,438,186 A | 8/1995 | Nair et al. |
| 5,442,567 A | 8/1995 | Small |
| 5,448,044 A | 9/1995 | Price et al. |
| 5,477,038 A | 12/1995 | Levine et al. |
| 5,504,808 A | 4/1996 | Hamrick, Jr. |
| 5,511,114 A | 4/1996 | Stimson et al. |
| 5,513,117 A | 4/1996 | Small |
| 5,550,358 A | 8/1996 | Tait et al. |
| 5,577,109 A | 11/1996 | Stimson et al. |
| 5,577,121 A | 11/1996 | Davis et al. |
| 5,661,254 A | 8/1997 | Steuer et al. |
| 5,696,908 A | 12/1997 | Muehlberger et al. |
| 5,699,528 A | 12/1997 | Hogan |
| 5,732,136 A | 3/1998 | Murphree et al. |
| 5,814,798 A | 9/1998 | Zancho |
| 5,841,365 A | 11/1998 | Rimkus |
| 5,859,419 A | 1/1999 | Wynn |
| 5,875,437 A | 2/1999 | Atkins |
| 5,878,141 A | 3/1999 | Daly et al. |
| 5,893,907 A | 4/1999 | Ukuda |
| 5,897,620 A | 4/1999 | Walker et al. |
| 5,920,848 A | 7/1999 | Schutzer et al. |
| 5,933,812 A | 8/1999 | Meyer et al. |
| 5,963,921 A | 10/1999 | Longfield |
| 6,000,608 A | 12/1999 | Dorf |
| 6,012,635 A | 1/2000 | Shimada et al. |
| 6,021,397 A | 2/2000 | Jones et al. |
| 6,032,859 A | 3/2000 | Muehlberger et al. |
| 6,041,308 A | 3/2000 | Walker et al. |
| 6,065,679 A | 5/2000 | Levie et al. |
| 6,112,191 A | 8/2000 | Burke |
| 6,144,948 A | 11/2000 | Walker et al. |
| 6,154,738 A | 11/2000 | Call |
| 6,189,787 B1 | 2/2001 | Dorf |
| 6,208,978 B1 | 3/2001 | Walker et al. |
| 6,249,773 B1 | 6/2001 | Allard et al. |
| 6,253,998 B1 | 7/2001 | Ziamo |
| 6,467,684 B2 | 10/2002 | Fite et al. |
| 6,704,714 B1 | 3/2004 | O'Leary et al. |
| 6,739,506 B1 | 5/2004 | Constantine |
| 6,865,544 B1 | 3/2005 | Austin |
| 6,999,943 B1 | 2/2006 | Johnson et al. |
| 7,010,507 B1 | 3/2006 | Anderson et al. |
| 7,031,939 B1 | 4/2006 | Gallagher et al. |
| 7,072,862 B1 | 7/2006 | Wilson |
| 7,127,452 B1 | 10/2006 | Yashiro |
| 7,177,829 B1 | 2/2007 | Wilson |
| 7,206,761 B2 | 4/2007 | Colvin |
| 7,258,273 B2 | 8/2007 | Griffin |
| 7,398,919 B2 | 7/2008 | Cooper |
| 7,426,492 B1 | 9/2008 | Bishop et al. |
| 7,451,920 B1 | 11/2008 | Rose |
| 7,509,286 B1 | 3/2009 | Bent et al. |
| 7,567,936 B1 | 7/2009 | Peckover et al. |
| 7,607,570 B1 | 10/2009 | Constantine |
| 7,628,319 B2 | 12/2009 | Brown et al. |
| 7,653,591 B1 | 1/2010 | Dabney |
| 7,702,583 B1 | 4/2010 | Hamilton et al. |
| 7,757,944 B2 | 7/2010 | Cline et al. |
| 7,783,571 B2 | 8/2010 | Fish et al. |
| 7,792,717 B1 | 9/2010 | Hankins et al. |
| 7,810,735 B2 | 10/2010 | Madani |
| 7,813,955 B2 | 10/2010 | Ariff et al. |
| 7,814,012 B2 | 10/2010 | Johnson |
| 7,904,333 B1 | 3/2011 | Perkowski |
| 7,933,833 B2 | 4/2011 | Hotz et al. |
| 8,046,256 B2 | 10/2011 | Chien et al. |
| 2001/0021925 A1 | 9/2001 | Ukigawa et al. |
| 2001/0034676 A1* | 10/2001 | Vasic ............................ 705/30 |
| 2001/0042785 A1 | 11/2001 | Walker et al. |
| 2002/0002075 A1 | 1/2002 | Rowe |
| 2002/0032612 A1 | 3/2002 | Williams et al. |
| 2002/0077971 A1 | 6/2002 | Allred |
| 2002/0152161 A1 | 10/2002 | Aoike |
| 2002/0194122 A1 | 12/2002 | Knox et al. |
| 2002/0194124 A1 | 12/2002 | Hobbs et al. |
| 2003/0061170 A1 | 3/2003 | Uzo |
| 2003/0074311 A1 | 4/2003 | Saylors et al. |
| 2003/0097331 A1 | 5/2003 | Cohen |
| 2003/0135459 A1 | 7/2003 | Abelman et al. |
| 2003/0144935 A1 | 7/2003 | Sobek |
| 2003/0158811 A1 | 8/2003 | Sanders et al. |
| 2003/0167225 A1 | 9/2003 | Adams |
| 2003/0191702 A1 | 10/2003 | Hurley |
| 2003/0191714 A1 | 10/2003 | Norris |
| 2003/0197059 A1 | 10/2003 | Tidball et al. |
| 2003/0200118 A1 | 10/2003 | Lee et al. |
| 2003/0208443 A1 | 11/2003 | Mersky |
| 2003/0217003 A1 | 11/2003 | Weinflash et al. |
| 2004/0036215 A1 | 2/2004 | Butler, II |
| 2004/0098351 A1 | 5/2004 | Duke |
| 2004/0111370 A1 | 6/2004 | Saylors et al. |
| 2004/0117250 A1 | 6/2004 | Lubow et al. |
| 2004/0117302 A1 | 6/2004 | Weichert et al. |
| 2004/0133515 A1 | 7/2004 | McCoy et al. |
| 2004/0143527 A1 | 7/2004 | Benkert et al. |
| 2004/0148252 A1 | 7/2004 | Fleishman |
| 2004/0153407 A1 | 8/2004 | Clubb et al. |
| 2004/0215554 A1 | 10/2004 | Kemper et al. |
| 2004/0225545 A1* | 11/2004 | Turner et al. ..................... 705/8 |
| 2004/0230523 A1 | 11/2004 | Johnson |
| 2004/0236646 A1 | 11/2004 | Wu et al. |
| 2005/0004839 A1 | 1/2005 | Bakker et al. |
| 2005/0015332 A1 | 1/2005 | Chen |
| 2005/0021363 A1 | 1/2005 | Stimson et al. |
| 2005/0075939 A1 | 4/2005 | Bao et al. |
| 2005/0108121 A1 | 5/2005 | Gravett et al. |
| 2005/0167481 A1 | 8/2005 | Hansen et al. |
| 2005/0173520 A1 | 8/2005 | Jaros et al. |
| 2005/0203837 A1 | 9/2005 | Leigh et al. |
| 2005/0205663 A1 | 9/2005 | Allgiene |
| 2005/0228724 A1 | 10/2005 | Frangiosa |
| 2005/0283436 A1 | 12/2005 | Greer et al. |

| | | | |
|---|---|---|---|
| 2006/0059085 A1 | 3/2006 | Tucker | |
| 2006/0085334 A1 | 4/2006 | Murphy | |
| 2006/0149665 A1 | 7/2006 | Weksler | |
| 2006/0149670 A1 | 7/2006 | Nguyen et al. | |
| 2006/0161499 A1 | 7/2006 | Rich et al. | |
| 2006/0190322 A1 | 8/2006 | Oehlerking et al. | |
| 2006/0206402 A1 | 9/2006 | Sullivan | |
| 2006/0212392 A1 | 9/2006 | Brown | |
| 2006/0212393 A1 | 9/2006 | Lindsay Brown | |
| 2006/0224502 A1 | 10/2006 | McGowan | |
| 2006/0249570 A1 | 11/2006 | Seifert et al. | |
| 2006/0259957 A1 | 11/2006 | Tam et al. | |
| 2006/0282356 A1 | 12/2006 | Andres et al. | |
| 2006/0282374 A1* | 12/2006 | Stone | 705/38 |
| 2007/0000997 A1 | 1/2007 | Lambert et al. | |
| 2007/0011089 A1 | 1/2007 | DeSchryver | |
| 2007/0038515 A1 | 2/2007 | Postrel | |
| 2007/0045401 A1 | 3/2007 | Sturm | |
| 2007/0061206 A1 | 3/2007 | LeFebvre | |
| 2007/0083462 A1 | 4/2007 | Cubillo et al. | |
| 2007/0087819 A1 | 4/2007 | Van Luchene et al. | |
| 2007/0100745 A1 | 5/2007 | Keiser | |
| 2007/0106603 A1 | 5/2007 | Whyte et al. | |
| 2007/0136194 A1 | 6/2007 | Sloan | |
| 2007/0152038 A1 | 7/2007 | Ciancio et al. | |
| 2007/0168265 A1 | 7/2007 | Rosenberger | |
| 2007/0174189 A1 | 7/2007 | Bishop et al. | |
| 2007/0175984 A1 | 8/2007 | Khandaker et al. | |
| 2007/0198352 A1 | 8/2007 | Kannegiesser | |
| 2007/0198403 A1 | 8/2007 | Aloni et al. | |
| 2007/0233596 A1 | 10/2007 | Ambrose | |
| 2007/0244778 A1 | 10/2007 | Bailard | |
| 2007/0250380 A1 | 10/2007 | Mankoff | |
| 2007/0262140 A1 | 11/2007 | Long, Sr. | |
| 2007/0265957 A1 | 11/2007 | Advani et al. | |
| 2007/0265960 A1 | 11/2007 | Advani et al. | |
| 2007/0267479 A1 | 11/2007 | Nix et al. | |
| 2007/0271178 A1 | 11/2007 | Davis et al. | |
| 2007/0282740 A1 | 12/2007 | Wendt | |
| 2008/0005001 A1* | 1/2008 | Davis et al. | 705/35 |
| 2008/0040261 A1 | 2/2008 | Nix et al. | |
| 2008/0040265 A1 | 2/2008 | Rackley, III et al. | |
| 2008/0052189 A1 | 2/2008 | Walker et al. | |
| 2008/0059363 A1 | 3/2008 | Hotz et al. | |
| 2008/0065532 A1 | 3/2008 | De La Motte | |
| 2008/0091519 A1 | 4/2008 | Foss | |
| 2008/0103970 A1 | 5/2008 | Books et al. | |
| 2008/0120129 A1 | 5/2008 | Seubert et al. | |
| 2008/0140561 A1 | 6/2008 | Neel | |
| 2008/0140568 A1 | 6/2008 | Henry | |
| 2008/0228643 A1 | 9/2008 | Hall | |
| 2008/0281734 A1 | 11/2008 | Longe et al. | |
| 2009/0048963 A1 | 2/2009 | Bishop et al. | |
| 2009/0063342 A1 | 3/2009 | Beckers | |
| 2009/0157220 A1 | 6/2009 | Walker et al. | |
| 2009/0164362 A1 | 6/2009 | Moore | |
| 2009/0164363 A1 | 6/2009 | Ahlers | |
| 2009/0192934 A1 | 7/2009 | Chu et al. | |
| 2009/0222367 A1 | 9/2009 | Jenkins et al. | |
| 2009/0228307 A1 | 9/2009 | Sorbe | |
| 2009/0254431 A1* | 10/2009 | Crowe et al. | 705/14.34 |
| 2010/0030687 A1 | 2/2010 | Panthaki et al. | |
| 2010/0057554 A1 | 3/2010 | Lanford | |
| 2010/0076875 A1 | 3/2010 | Ernst et al. | |
| 2010/0106555 A1 | 4/2010 | Mneimneh et al. | |
| 2010/0222132 A1 | 9/2010 | Sanford et al. | |
| 2010/0280949 A1 | 11/2010 | Van Rensburg | |
| 2010/0306104 A1 | 12/2010 | Johnson | |
| 2010/0312684 A1 | 12/2010 | Kemper et al. | |

FOREIGN PATENT DOCUMENTS

| | | |
|---|---|---|
| EP | 0397512 | 11/1990 |
| EP | 0397512 A2 | 11/1990 |
| EP | 0619565 | 10/1994 |
| EP | 0619565 A1 | 10/1994 |
| EP | 0348932 A2 | 5/1995 |
| JP | 2-238593 | 9/1990 |
| JP | 2-238593 A | 9/1990 |
| JP | 2-278495 | 11/1990 |
| JP | 2-278495 A | 11/1990 |
| JP | 3-100791 | 4/1991 |
| JP | 3-100791 A | 4/1991 |
| JP | 4-165588 | 6/1992 |
| JP | 4-165588 A | 6/1992 |
| KR | 2010010217 | 2/2010 |
| WO | WO 86/02757 A1 | 5/1986 |
| WO | WO8602757 | 5/1986 |
| WO | WO 86/07647 A1 | 12/1986 |
| WO | WO8607647 | 12/1986 |
| WO | WO 88/03297 A1 | 5/1988 |
| WO | WO8803297 | 5/1988 |
| WO | WO 89/08899 A1 | 9/1989 |
| WO | WO8908899 | 9/1989 |
| WO | WO 91/09370 A1 | 6/1991 |
| WO | WO9109370 | 6/1991 |
| WO | WO 93/09515 A1 | 5/1993 |
| WO | WO9309515 | 5/1993 |
| WO | WO 94/10649 A1 | 5/1994 |
| WO | WO9410649 | 5/1994 |
| WO | WO 94/28498 A1 | 12/1994 |
| WO | WO9428498 | 12/1994 |
| WO | WO 95/03570 A2 | 2/1995 |
| WO | WO9503570 | 2/1995 |
| WO | WO 97/46986 A1 | 12/1997 |
| WO | WO9746986 | 12/1997 |
| WO | WO0060487 | 10/2000 |
| WO | WO 2007133315 A2 | 11/2007 |
| ZA | 200709282 | 10/2007 |

OTHER PUBLICATIONS

United Nations Conference on Trade and Development, E-finance and Small and Medium-Size Enterprises (SMEs) in Developing and Transition Economies, UNCTAD Expert Meeting, Oct. 17, 2001.

Tim Jones, Paradigms lost, RSA Journal, Oct. 2006, pp. 28-31.

Diego Rumiany, Internet Bidding for Microcredit: making it work in the developed world, conceiving it for the developing world, Mar. 2007.

Stefan Heng, Thomas Meyer, and Antje Stobbe, Implications of Web 2.0 for financial institutions: Be a driver, not a passenger, Munich Personal RePEc Archive, Jul. 31, 2007.

Matt Flannery, Kiva and the Birth of Person to Person Microfinance, Innovations, pp. 31-56, Winter & Spring 2007.

Michael K Hulme and Collette Wright, Internet Based Social Lending: Past, Present and Future, Social Futures Observatory, Oct. 2006.

Richard W. Coleman, Is the Future of the Microfinance Movement to be Found on the Internet?, International Trade and Finance Association Working Papers 2007.

Amanda Scott and Patrick Towell, The web we weave, Financial World, pp. 12-15, Nov. 2006.

Prosper, Access and Transparency through Person-to-Person Lending, FDIC Advisory Committee on Economic Inclusion, Mar. 28, 2007.

Co-pending U.S. Appl. No. 12/338,365, filed Dec. 18, 2008, titled "Transfer Account Systems, Computer Program Products, and Associated Computer-Implemented Methods".

Co-pending U.S. Appl. No. 12/338,402, filed Dec. 18, 1008, titled "Transfer Account Systems, Computer Program Products, and Associated Computer-Implemented Methods".

Co-pending U.S. Appl. No. 12/338,440, filed Dec. 18, 2008, titled "Transfer Account Systems, Computer Program Products, and Associated Computer-Implemented Methods".

Co-pending U.S. Appl. No. 12/338,684, filed Dec. 18, 2008, titled "Transfer Account Systems, Computer Program Products, and Associated Methods".

Co-pending U.S. Appl. No. 12/338,497, filed Dec. 18, 2008, titled "Private Label Promotion Card System, Program Product, and Associated Computer-Implemented Methods".

Co-pending U.S. Appl. No. 12/338,540, filed Dec. 18, 2008, titled "Private Label Promotion Card System, Program Product, and Associated Computer-Implemented Methods".

Co-pending U.S. Appl. No. 12/338,584, filed Dec. 18, 2008, titled "Transfer Account Systems, Computer Program Products, and Methods to Prioritize Payments From Preselected Bank Accounts".

Co-pending U.S. Appl. No. 12/338,645, filed Dec. 18, 2008, titled "Transfer Account Systems, Computer Program Products, and Methods to Prioritize Payments From Preselected Bank Accounts".
International Search Report from co-pending PCT Application No. PCT/US2009/034692 filed Feb. 20, 2009 titled "Methods to Advance Loan Proceeds on Prepaid Cards, Associated Systems and Computer Program Products".
Co-pending U.S. Appl. No. 12/397,113, filed Mar. 3, 2009, titled "Person-to-Person Lending Program Product, System, and Associated Computer-Implemented Methods".
Co-pending U.S. Appl. No. 12/389,749, filed Feb. 20, 2009, titled "Methods to Advance Loan Proceeds on Prepaid Cards, Associated Systems and Computer Program Products".
Co-pending U.S. Appl. No. 12/417,199, filed Apr. 2, 2009, titled "System, Program Product, and Associated Methods to Autodraw for Micro-Credit Attached to a Prepaid Card".
Co-pending U.S. Appl. No. 12/417,211, filed Apr. 2, 2009, titled "System, Program Product, and Associated Methods to Autodraw for Micro-Credit Attached to a Prepaid Card".
Co-pending U.S. Appl. No. 12/417,182, filed Apr. 2, 2009, titled "System, Program Product, and Method to Authorize Draw for Retailer Optimization".
Co-pending U.S. Appl. No. 12/407,320, filed Mar. 19, 2009, titled "Computerized Extension of Credit to Existing Demand Deposit Accounts, Preparid Cards and Lines of Credit Based on Expected Tax Refund Proceeds, Associated Systems and Computer Program Products".
Co-pending U.S. Appl. No. 12/417,162, filed Apr. 2, 2009, titled "System, Program Product, and Method for Debit Card and Checking Account Autodraw".
Co-pending U.S. Appl. No. 12/367,187, filed Feb. 6, 2009, titled "Government Targeted-Spending Stimulus Card System, Program Product and Computer-Implemented Methods".
Co-pending U.S. Appl. No. 12/465,277, filed May 13, 2009, titled "System, Program Product, and Computer-Implemented Method for Loading a Loan on a Pre-Paid Card".
Co-pending U.S. Appl. No. 12/465,306, filed May 13, 2009, titled "System, Program Product, and Computer-Implemented Method for Loading a Loan on an Existing Pre-Paid Card".
Co-pending U.S. Appl. No. 12/465,803, filed May 13, 2009, titled "System, Program Product, and Method for Loading a Loan on a Pre-Paid Card".
Co-pending U.S. Appl. No. 13/036,076 filed Feb. 28, 2011, titled Machine, Program Product, and Computer Implemented Method to Construct a Person-To-Person Loan.
Office Action dated Feb. 18, 2011, in co-pending U.S. Appl. No. 12/338,402.
Co-pending U.S. Appl. No. 12/562,331, filed Sep. 18, 2009, titled Computerized Extension of Credit to Existing Demand Deposit Accounts, Prepaid Cards and Lines of Credit Based on Expected Tax Refund Proceeds, Associated Systems and Computer Program Products.
Office Action dated Mar. 4, 2011, in co-pending U.S. Appl. No. 12/338,684.
Office Action dated Mar. 17, 2011, in co-pending U.S. Appl. No. 12/417,199.
Office Action dated Mar. 17, 2011, in co-pending U.S. Appl. No. 12/465,803.
Office Action dated Mar. 22, 2011, in co-pending U.S. Appl. No. 12/338,584.
Office Action dated Mar. 29, 2011, in co-pending U.S. Appl. No. 12/417,211.
Office Action dated Mar. 29, 2011, in co-pending U.S. Appl. No. 12/407,320.
Office Action in co-pending U.S. Appl. No. 12/609,896 dated Apr. 5, 2011.
Office Action in co-pending U.S. Appl. No. 12/417,162 dated Apr. 13, 2011.
Orszag, Peter, "Unemployment Insurance as an Economic Stimulus", Center for Budget and Policy Priorities, Nov. 15, 2011.
Powell, Robert L., "Statewide Electronic Commerce Program Status Report", State of North Carolina Office of the State Controller, Mar. 7, 2007.
Parrott, James, "Jittery Wall Street, Calm City?", Gotham Gazette, Apr. 16, 2007.
Zandi, Mark, "Washington Throws the Economy a Rope", Moody's Economy.com, Jan. 22, 2008.
Blair, Christine E., et al., "Challenges to the Dual Banking System: The Funding of Bank Supervision", FDIC Bank Review, Mar. 31, 2006.
Office Action for co-pending U.S. Appl. No. 12/367,187 dated Jun. 27, 2011.
"Developing Asia and the World", Asian Development Bank 2002.
International Search Report for PCT/US2009/039495 dated May 18, 2009.
International Search Report for PCT/US2008/087689 dated Jun. 17, 2009.
International Search Report for PCT/US2009/043988 dated Jul. 14, 2009.
International Search Report for PCT/US2009/039492 dated May 14, 2009.
International Search Report dated May 27, 2009 for PCT/US2009/039504 filed Apr. 3, 2009.
International Search Report dated Jun. 8, 2009 for PCT/US2009/039512 filed Apr. 3, 2009.
International Search Report dated Jun. 30, 2009 for PCT/US2009/043978 filed May 14, 2009.
Office Action dated Jul. 9, 2010 for U.S. Appl. No. 12/338,365.
Office Action dated Jul. 9, 2010 for U.S. Appl. No. 12/338,645.
Co-pending U.S. Appl. No. 12/554,659, filed Sep. 4, 2009, titled "System, Method, and Program Product for Foreign Currency Travel Account".
Co-pending U.S. Appl. No. 12/554,432, filed Sep. 4, 2009, titled "System, Program Product and Methods for Retail Activation and Reload Associated With Partial Authorization Transactions".
Cross, Sam Y., All About . . . the Foreign Exchange Market in the United States, 1998, Federal Reserve Bank of New York.
Office Action dated Sep. 28, 2010 for co-pending U.S. Appl. No. 12/338,402, filed Dec. 18, 2008.
Office Action dated Sep. 3, 2010 for co-pending U.S. Appl. No. 12/417,162, filed Apr. 2, 2009.
Office Action from co-pending U.S. Appl. No. 12/626,349, dated Nov. 22, 2011.
Co-pending U.S. Appl. No. 12/607,780, filed Oct. 28, 2009, titled Shopping Center Gift Card Offer Fulfillment Machine, Program Product, and Associated Methods.
Co-pending U.S. Appl. No. 12/609,896, filed Oct. 30, 2009, titled Machine Methods, and Program Product for Electronic Order Entry.
Co-pending U.S. Appl. No. 12/626,349, filed Nov. 25, 2009, titled Machine, Methods, and Program Product for Electronic Inventory Tracking.
International Search Report for PCT/US09/56072 dated Oct. 20, 2009.
Bank Deals—Best Rates and Deals: EverBank's World Currency CDs—My Interview with EverBank's Executive Frank Trotter, http://bankdeals.blogspot.com, Jul. 29, 2007.
Foreign Exchange Market, http://en.wikipedia.org.
Avoid Gift Card Pitfalls, ConsumerReports.org.
VIPGift Receives Investment From Summit Partners and Bridgescale Partners, Nov. 11, 2008, Chattanooga, TN and Palo Alto, CA.
Final Office Action dated Jan. 26, 2011, in co-pending U.S. Appl. No. 12/338,365.
Final Office Action dated Jan. 26, 2011, in co-pending U.S. Appl. No. 12/338,645.
Final Office Action dated Jan. 19, 2011, in co-pending U.S. Appl. No. 12/417,162.
Office Action dated Feb. 1, 2011, in co-pending U.S. Appl. No. 12/308,749.
Co-pending U.S. Appl. No. 12/814,405, filed Jun. 11, 2010 titled Environmental-Friendly Fuel Credit Card System, Program Product, and Computer-Implemented Methods.
Co-pending U.S. Appl. No. 12/877,490, filed Sep. 8, 2010 titled System, Program Product, and Method for Debit Card and Checking Account Autodraw.

Co-pending U.S. Appl. No. 12/877,524, filed Sep. 8, 2010 titled System, Program Product, and Method for Debit Card and Checking Account Autodraw.
Co-pending U.S. Appl. No. 12/562,331, filed Sep. 18, 2009 titled Computerized Extension of Credit to Existing Demand Deposit Accounts, Prepaid Cards and Lines of Credit Based on Expected Tax Refund Proceeds, Associated Systems and Computer Program Products.
Krino, Gary, et al., A Birthday Card That Pays Off, The Orange County Register, Jul. 19, 1996, 2 pages.
Cohen, Bruce, Alternative to Cash Gains Ground, The Financial Post, Apr. 22, 1994, 2 pages.
Bank of Boulder POS Debit Solution at the Table Now in Beta: First Bank to Certify IVI Spirit C2000 on MAPP (R), Business Wire, Aug. 3, 1994, 1 page.
Co-pending U.S. Appl. No. 12/700,681, filed Feb. 4, 2010.
Co-pending U.S. Appl. No. 12/889,281, filed Sep. 23, 2010.
Co-pending U.S. Appl. No. 12/892,847, filed Sep. 28, 2010.
Co-pending U.S. Appl. No. 12/731,852, filed Mar. 25, 2010.
Microtrax Ltd., PC Electronic Payment Systems Reference Manuel, 1995 (381 pages).
John P. Caskey and Gordon H. Selton, Jr., Is the Debit Card Revolution Finally Here?, Federal Reserve Bank of Kansas City, Economic Review, Fourth Quarter 1994, pp. 70-95, vol. 79 #4 (17 pages).
Laura Castaneda, Business Promote Services to Customers Day in and Day Out, The Dallas Morning News, Nov. 26, 1994, 3 pages.
Margaret Mannix, Checkout Tech, U.S. News & World Report, Feb. 27, 1995, 6 pages.
Credit Terminals to be Used at Canadian Liquor Outlets, Card News, Jan. 23, 1995, 1 page.
Debit Card Popularity on the Rise, Chain Store Age Executive, Jan. 1994, 1 page.
Debit Goes to Dinner, Credit Card Management, New York, Oct. 1994, 2 pages.
Alan Peppard, Down and Dirty in Deep Ellum, The Dallas Morning News, Dec. 3, 1994, 2 pages.
Everest Reference Manual, VeriFone Part No. 25399, Revision A, Manual Revision 1.0, Jul. 1995, 66 pages.
Express Cards and Trains, Chain Store Age Executive Edition, Jan. 1995, 1 page.
Suzanne Brown, Goodnight Amy, Meg, Beth and Jo, Rocky Mountain News, Dec. 8, 2994, 1 page.
Robert J. Klein, Here Comes the Debit Card, D&B Reports, Jul./Aug. 1990, 2 pages.
Hypercom S7C Advertisement, Chain Store Age, Sep. 1995, 4 pages.
Hypercom S7SC Advertisement, Chain Store Age, Feb. 1996, 2 pages.
IBM 4680-4690 Advanced Payment System for Chain Drug Sales Application User's Guide, Nov. 1996, 256 pages.
IBM 4680-4690 Advanced Payment System for Chain Drug Sales Application User's Guide, Jul. 1996, 248 pages.
IBM 4680-4690 Advanced Payment System for Supermarket Application User's Guide, Sep. 1996, 222 pages.
Fox, Linda A., Keep an Eye on Your Credit Card, The Toronto Sun, Aug. 9, 1996, 1 page.
Pyatt, Rudolph A., Jr., Mobil Stations to Permit Use of Bank Cards, The Washington Post.
NCR 4430-5000 MSR/PIN User's Guide, 1994, 265 pages.
Nieman Marcus: High-Tech for the Holidays, ADWEEK, Dec. 5, 1994, 1 page.
Neiman Marcus Offers Electronic Gift Certificate, Card Fax, Jan. 23, 1995, 1 page.
Neiman Marcus to Lauch NM Express Automated Gift Card, PR Newswire, Nov. 22, 1994, 1 page.
NM Express Card Advertisement, The New Yorker, Dec. 12, 1994, 3 pages.
Service Mark Registration No. 1,981,044 for "NM Express Card", registered Jun. 18, 1996, 1 page.
Omni 480/490 Programmer's Guide, VeriFone Part No. 12924—Revision A, Manual Revision 1.0, Oct. 1993, 228 pages.
One Company's Diversification Shakes Up Peripherals Market, Chain Store Age, Jun. 1996, 3 pages.

O'Keefe, Michael, Portable POS Debit Terminal Mean Greater Convenience, Bank Systems & Technology, Nov. 1994, 2 pages.
POS Terminal Can Handle Direct Debits, ABA Banking Journal, Sep. 1984, 2 pages.
Racal Corp. Advertisement, POS Terminal Eliminates Credit Card Vouchers, ABA Banking Journal, Nov. 1985, 2 pages.
Szabo, Joan C., The Changing World of Financial Services, Nation's Business, Oct. 1994, 7 pages.
VeriFone Everest Advertisement, Stores, May 1995, 2 pages.
VeriFone Folio (TM) Brings Credit and Debit Card Payment to the Restaurant Table, PR Newswire, May 16, 1994, 3 pages.
David B. Barnes, VeriFone Introduces Everest (TM) Customer Activated Payment System to Multi-Lane Retail Market, PR Newswire, Feb. 20, 1995, 2 pages.
VeriFone Introduces Pinpad (TM) 1000 to Point-of-Sale Debit Market, M2 Presswire, Apr. 21, 1995, 1 page.
Notice of Allowance in co-pending U.S. Appl. No. 12/554,659 dated Aug. 2, 2011.
Office Action in co-pending U.S. Appl. No. 12/338,440 dated Aug. 1, 2011.
Financial Advice Investment Money Oct. 1, 2009 at 7:25am, HSBC Offshore Internet Banking (Notice of Allowance in co-pending U.S. Appl. No. 12/554,659).
Financial Advice Investment Money Oct. 1, 2009 at 5:50pm, HSBC Offshore Internet Banking (Notice of Allowance in co-pending U.S. Appl. No. 12/554,659).
Office action from co-pending U.S. Appl. No. 12/338,497 dated Aug. 18, 2011.
Notice of Allowance for co-pending U.S. Appl. No. 12/417,199 dated Aug. 18, 2011.
Notice of Allowance for co-pending U.S. Appl. No. 12/417,211 dated Aug. 22, 2011.
Wolfe, Daniel, "An E-Variation on Payday Loan Theme", American Banker, Jul. 28, 2005 (Notice of Allowance).
"Letter of Credit Explained: What is Letter of Credit?", Dec. 26, 2005, pp. 1-2 (Office Action from co-pending U.S. Appl. No. 12/338,540 dated Sep. 1, 2011).
Office Action from co-pending U.S. Appl. No. 12/338,540 dated Sep. 1, 2011.
Notice of Allowance of co-pending U.S. Appl. No. 12/338,365 dated Sep. 1, 2011.
Final Office Action in co-pending U.S. Appl. No. 12/338,584 dated Sep. 15, 2011.
Final Office Action in co-pending U.S. Appl. No. 12/338,684 dated Sep. 23, 2011.
Lazarus, David, "120% rate for Wells' Advances", Oct. 16, 2004, San Francisco Chronicle (Final Office Action in co-pending U.S. Appl. No. 12/338,684 dated Sep. 23, 2011).
Office Action in co-pending U.S. Appl. No. 12/397,113 dated Sep. 30, 2011.
Notice of Allowance in co-pending U.S. Appl. No. 12/338,645 dated Oct. 3, 2011.
Office Action in co-pending U.S. Appl. No. 12/417,182 dated Sep. 28, 2011.
Zubko, N., "An Automotic Connection Electronic Transaction Tools Help Manufacturers Connect With Suppliers to Streamline Sourcing Efforts", Industry Week, Jul. 2008, pp. 26-27, vol. 257, No. 7.
Notice of Allowance from co-pending U.S. Appl. No. 12/609,896 dated Oct. 27, 2011.
Office Action from co-pending U.S. Appl. No. 12/465,277 dated Oct. 20, 2011.
Office Action from co-pending U.S. Appl. No. 12/562,331 dated Oct. 20, 2011.
Notice of Allowance from co-pending U.S. Appl. No. 12/407,320 dated Oct. 18, 2011.
VeriFone TCL Terminal Control Language Programmer's Manual, VeriFone Part No. 00368-01, Revision G, Manual Revision 8.0, Aug. 1992, 362 pages.
VeriFone Tranz 330 Reference Manual, Verifone Part No. 00483—Revision D, Manual Revision 3.01, Apr. 1990, 144 pages.

MicroTrax Ltd. Omni 490M (and 490ML) Operation Manual for Integrated and Non-Integrated Configurations, 1994, 60 pages.

MicroTrax Electronic Payment Systems: The MicroTrax Pinstripe Lane Equipment Users Guide, MicroTrax Ltd., Newport Beach, CA 1991, 54 pages.

IBM 4680-4690 Supermarket Application—Electronic Funds Transfer Feature Enhancement: User's Guide, IBM Corp., Research Triangle Park, NC, Sep. 1995, 318 pages.

IBM 4680 General Sales Application Electronic Funds Transfer User's Guide, IBM Corp., Research Triangle Park, NC, Dec. 1990, 260 pages.

IBM 4680 General Sales Application Electronic Funds Transfer User's Guide, IBM Corp., Research Triangle Park, NC, Mar. 1991, 263 pages.

IBM 4680 General Sales Application: Guide to Operations, Research Triangle Park, NC, Jun. 1991, 429 pages.

\* cited by examiner

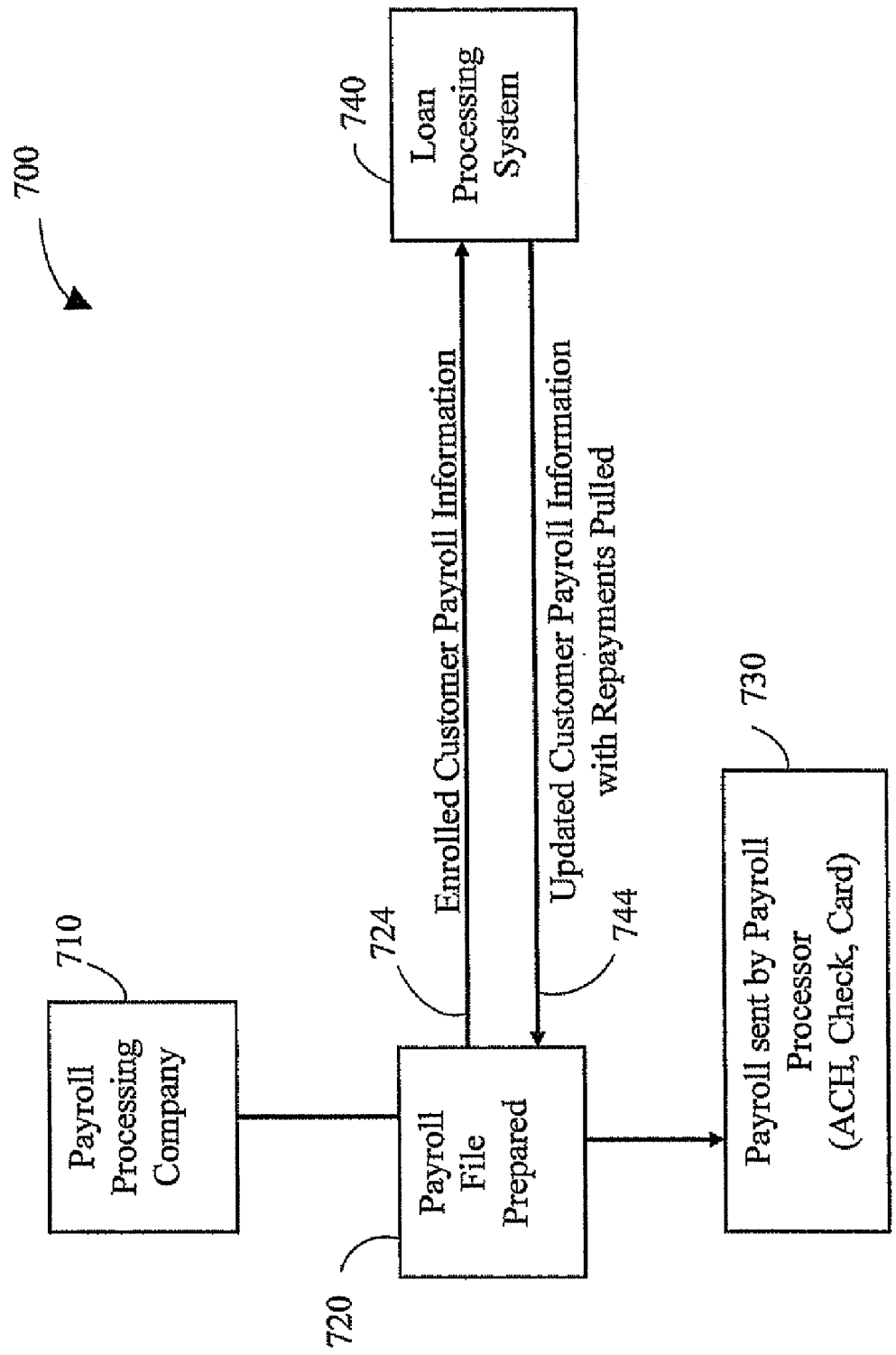

COMPUTER-IMPLEMENTED METHODS, PROGRAM PRODUCT, AND SYSTEM TO ENHANCE BANKING TERMS OVER TIME

RELATED APPLICATIONS

This application claims priority to and the benefit of U.S. Provisional Patent Application Ser. No. 61/016,213, by Sorbe et al., titled "Transfer Account Systems, Computer Program Products, and Associated Methods" filed Dec. 21, 2007; U.S. Provisional Patent Application Ser. No. 61/052,454, by Sorbe et al., titled "Transfer Account Systems, Computer Program Products, and Methods to Prioritize Payments from Preselected Bank Account" filed May 12, 2008; U.S. Provisional Patent Application Ser. No. 61/029,975, by Sorbe et al., titled "Methods To Advance Loan Proceeds On Prepaid Cards, Associated Systems and Computer Program Products" filed on Feb. 20, 2008; U.S. Provisional Patent Application Ser. No. 61/042,612, by Ahlers et al., titled "System, Program Product, and Associated Methods To Autodraw for Micro-Credit Attached to a Prepaid Card" filed on Apr. 4, 2008; U.S. Provisional Patent Application Ser. No. 61/042,624, by Crowe et al., titled "System, Program Product, and Method To Authorize Draw for Retailer Optimization" filed on Apr. 4, 2008; U.S. Provisional Patent Application Ser. No. 61/032,750, by Ahlers et al., titled "Methods, Program Product, and System for Micro-Loan Management" filed on Feb. 29, 2008; U.S. Provisional Patent Application Ser. No. 61/060,559, by Galit et al., titled "Methods, Program Product, and System to Enhance Banking Terms Over Time" filed on Jun. 11, 2008; U.S. Provisional Patent Application Ser. No. 61/082,863, by Ahlers et al., titled "System, Program Product, and Method For Debit Card and Checking Account Autodraw" filed on Jul. 23, 2008; U.S. Provisional Patent Application Ser. No. 61/053,056, by Galit et al., titled "System, Program Product, and Method For Loading a Loan On a Pre-Paid Card" filed on May 14, 2008, all of which are each incorporated herein by reference in their entireties. This application also relates to U.S. patent application Ser. No. 12/338,365, by Sorbe et al., titled "Transfer Account Systems, Computer Program Products, and Associated Computer-Implemented Methods" filed on the same day as this application, Dec. 18, 2008; U.S. patent application Ser. No. 12/338,402, by Sorbe et al., titled "Transfer Account Systems, Computer Program Products, and Associated Computer-Implemented Methods" filed on the same day as this application, Dec. 18, 2008; U.S. patent application Ser. No. 12/338,440, by Sorbe et al., titled "Transfer Account Systems, Computer Program Products, and Associated Computer-Implemented Methods" filed on the same day as this application, Dec. 18, 2008; U.S. patent application Ser. No. 12/338,584, by Sorbe et al., titled "Transfer Account Systems, Computer Program Products, and Computer-Implemented Methods to Prioritize Payments from Preselected Bank Account" filed on the same day as this application, Dec. 18, 2008; U.S. patent application Ser. No. 12/338,465, by Sorbe et al., titled "Transfer Account Systems, Computer Program Products, and Computer-Implemented Methods to Prioritize Payments from Preselected Bank Account" filed on the same day as this application, Dec. 18, 2008; U.S. patent application Ser. No. 12/338,684, by Ahlers et al., titled "Computer-Implemented Methods, Program. Product, and System for Micro-Loan Management" filed on the same day as this application, Dec. 18, 2008, all of which are each incorporated herein by reference in their entireties.

BACKGROUND

1. Field of Invention

The present invention relates generally to the financial service and banking industries, and, more particularly, to systems, program products, and associated computer-implemented methods for providing a micro-loan product to prepaid cards and for managing access to a line of credit for a prepaid card.

2. Background

It is known that tens of millions of consumers in the United States have either limited or no access to traditional credit, either as a result of poor or limited credit history. It is further known that millions of prepaid cards are issued each year in the United States. It is also known that many of the consumers with prepaid cards rely primarily on cash and a prepaid card account for their personal finances; these consumers, for example, often do not have a traditional checking, savings, or other bank deposit account, and they usually do not write checks. It has been acknowledged by many that those without bank accounts and who often rely on prepaid cards may be underserved. These consumers are typically not easily able to access credit through traditional banking channels, though they may have an ongoing relationship with a prepaid card issuer, for example.

It is recognized that short-term lending is a $20 billion plus per year industry, and some industry experts believe an appropriate manner of offering micro-lending may be through a federal bank, especially to those underserved, such as those not having a checking account or other bank deposit account. Yet there can be many obstacles to those being underserved to using a federal bank or any bank for that matter, based on, for example, lack of effective bank products, risks associated with bank products, use of FICO scores to determine credit availability, and costs to those being underserved does not, or is not perceived to, outweigh the benefits for use of existing bank products.

As described in U.S. Provisional Patent Applications Ser. No. 61/032,750 titled "Methods, Program Product, and System for Micro-Loan Management" filed on Feb. 29, 2008, Applicants have previously provided introductory micro-lending and line of credit and products to those underserved by traditional bank products. Yet those consumers with access to and experience with non-traditional micro-lending and line of credit bank products, whether through a payroll prepaid card or similar program, however, may still be underserved by the terms available with these introductory products.

SUMMARY OF INVENTION

In view of the foregoing, Applicants have recognized a need for enhanced lending options, bank products, and prepaid card products for consumers with access to and experience with micro-lending and non-traditional line of credit bank products, whether through a payroll prepaid card or similar program. The embodiments of the present invention reward responsible behavior by the consumer with more favorable loan terms. The present invention provides embodiments of systems, program products, and associated computer-implemented methods for micro-loans, including through and by use of prepaid cards, and bank product management and enhanced lending options for both banks and bank customers, as well as other financial institutions.

For example, Applicants have recognized a growing demand and need within the prepaid card industry to provide more favorable credit options to consumers who have a payroll prepaid card and who demonstrate responsible behavior with micro-lending and line of credit bank products. A payroll prepaid card is a prepaid card associated with a recurring direct deposit, e.g., an employer's payroll deposit, a federal or state government electronic benefits payment, an annuity, or other stream of payments as understood by those skilled in the art. In general, eligibility for a payroll prepaid card requires verification of a minimum age, e.g., 18 years or older, and a government screening process, e.g., by the Office of Foreign Assets Control of the United States Department of the Treasury, to comply with federal regulations, such as, for example, the Patriot Act, as understood by those skilled in the art. Applicants have also recognized that historical data associated with an introductory micro-lending and line of credit bank product associated with a prepaid card can be analyzed to determine eligibility for enhanced products and programs with more favorable terms to the consumer. This micro-lending and line of credit bank product, for example, can provide loan funds only in one or more preselected increments with a fee associated with each increment, with repayment through a direct deposit. This historical data includes, for example, the consumers use of a line of credit associated with the introductory micro-lending bank product, subsequent repayment history, and historical direct deposit information. According to embodiments of the present invention, a consumer exhibiting responsible behavior with the introductory micro-lending and line of credit program for a certain period of time, e.g., six months, without late payments, defaults, delinquency, or other such irresponsible behavior as understood by those skilled in the art, can become eligible for a line of credit program with loan terms more favorable to the consumer than an introductory program. In addition, eligibility to the line of credit program can be denied according to embodiments of the present invention if a consumer has a prior charged-off line of credit or an outstanding, unpaid existing line of credit. Advantageously, eligibility does not depend on FICO scores, as understood by those skilled in the art, which Applicants further recognize as at least one source of the problem of credit availability to those underserved by traditional bank products.

Embodiments of the present invention provide, for example, for the enrollment of a consumer in the enhanced line of credit program through an on-line process. For example, a consumer can access a website or other computer program product from the bank or financial institution, located a computer server associated with the bank or financial institution, to enroll in the line of credit program using a browser or other software through a computer network, through a global communication network such as the Internet or Web 2.0, or through a computer program product stored on a tangible computer readable memory or storage device. Having determined that a consumer is eligible, the enrollment process can include, for example, requesting an e-mail address from the consumer for statement purposes. In addition, the enrollment of the consumer in the line of credit program is responsive to the consumer's acceptance of terms and conditions of the line of credit program. The terms and conditions of the line of credit program can include a privacy policy as understood by those skilled in the art. The on-line enrollment embodiments of the present invention advantageously provide a convenient and cost effective way for a consumer to register for the line of credit program with the bank or financial institution without having to enter a brick and mortar location during business hours.

Embodiments of the present invention provide, for example, for assessing a loan advance fee of a predetermined percentage, e.g., 10%, of the value of the advance so that the loan fee is proportional to the value of the loan and for receiving loan repayments over one or more predetermined direct deposit periods, e.g., 5 periods. In addition, repayment can include an electronic check drawn on the prepaid card account. For example, a loan amount of $500 can have a loan advance fee with a predetermined percentage of 10% of the value of the loan; therefore, the loan advance fee can be $50 (10%×$500=$50). The total $550 ($500 principle+$50 fee) can, for example, be paid back in 5 payments of $110 each, using an automatic electronic check. As understood by those skilled in the art, the interest rate and other repayment terms of the embodiments of the present invention can be more favorable and less expensive to the consumer than introductory line of credit products.

Embodiments of the present invention provide, for example, for receiving authorization for an advance under the line of credit program from the consumer so that the consumer authorizes all advances. There are no automatic advances. Authorization can conveniently include a written correspondence from the customer, a customer selection on a website, a telephone conversation with an interactive voice response unit (IVRU), a telephone conversation with a customer service representative, an interaction using mobile phone, or a combination of these as understood by those skilled in the art, allowing a customer to obtain a loan without the need to walk into a brick and mortar location. Similarly, embodiments of the present invention provide, for example, for cancelling an advance through a call to a customer service center.

Embodiments of the present invention provide, for example, for extending an amount of credit to the enrolled consumer through the line of credit program defining a consumer credit limit. According to embodiments of the present invention, the consumer credit limit is capped through underwriting criteria to ensure that no more than a predetermined percentage of a consumer's historic direct deposit amount is required for minimum repayments associated with the line of credit program. In addition, embodiments of the present invention can, for example, provide for a maximum allowable credit limit for a consumer that is less than the cap or ceiling determined by the underwriting criteria. For example, a consumer's historic direct deposit amount, or take home pay, can be $1100, paid twice a month. If the underwriting criteria is to ensure that no more than, e.g., 20%, of take home pay is required for a minimum loan repayment, then under the line of credit program the consumer's minimum payment can be up to $220 per pay period. For a typical loan period with 5 repayments, the consumer credit limit can be a total of $1,100 for principle and interest ($220 per pay period×5 pay periods=$1,100). If the loan advance fee has a predetermined percentage of 10% under the line of credit program, then the consumer credit limit can be $1,000 for principle only.

Embodiments of the present invention provide, for example, for changing the consumer credit limit. When the amount of the recurring direct deposit for the consumer changes, for example, by the consumer getting a raise, by changing the amount of tax withholding associated with each paycheck, by wages being garnished by the employer, or other event as understood by those skilled in the art, the consumer credit limit can be adjusted accordingly according to embodiments of the present invention. Changes can occur in predetermined increments, e.g., $100 increments. In addition, embodiments of the present invention provide, for example, for notifying the consumer of changes in the consumer credit limit through e-mail, traditional mail, or both.

Embodiments of the present invention provide, for example, for suspending access to funds under the line of credit program in the event of a missed payment, an interruption in direct deposits, a negative card balance, a preselected threshold number of consecutive loans from the line of credit program within a preselected time period, or a combination thereof as understood by those skilled in the art. As understood by those skilled in the art, the major risks to the lender are that the customer loses or changes jobs prior to final loan repayment or terminates the direct deposit to the prepaid card. While the embodiments of the present invention reward responsible behavior by the consumer with more favorable loan terms, the embodiments also deny access to the favorable terms in the event of irresponsible behavior, protecting the lender from further risk exposure and protecting the consumer from the effects additional over-borrowing.

According to other embodiments of the present invention, the financial institution can be a federally chartered bank, and the line of credit program can be bank product so that the line of credit program complies with federal Regulation Z, including monthly statements with all fees assessed, as understood by those skilled in the art. Advantageously, these embodiments provide consumer protection for the line of credit product, as well as monitoring, control, and management by a bank, which can be a significant benefit from the perspective of the customer, regulators, and public opinion through consumer activists.

For example, according to an embodiment of a computer-implemented method of managing access to a line of credit for a prepaid card, the computer-implemented method includes determining eligibility for a line of credit program from a financial institution responsive to a consumers prior enrollment in a payroll prepaid card program and one or more of the following: the consumer's historical direct deposit data, and data associated with the consumer's historical behavior in the payroll card program. The computer-implemented method also includes enrolling the consumer in the line of credit program through an on-line process responsive to an acceptance of terms and conditions of the line of credit program by the consumer. The computer-implemented method farther includes extending an amount of available credit to the enrolled consumer through the line of credit program defining a consumer credit limit. The consumer credit limit can be capped through underwriting criteria to ensure that no more than a predetermined percentage of a consumers historic direct deposit amount is required for minimum repayments associated with the line of credit program. The computer-implemented method also includes receiving authorization for an advance under the line of credit program from the consumer so that the consumer authorizes all advances, assessing a loan advance fee of a predetermined percentage of the value of the advance, receiving loan repayments over one or more predetermined direct deposit periods, and changing the consumer credit limit by preselected increments responsive to a change in the consumer's direct deposit amount.

In an embodiment of a program product stored in one or more tangible computer readable media and readable by a computer, for example, the program product can operate to perform the various instructions when read by the computer. The instructions include determining eligibility for a line of credit program from a financial institution responsive to a consumer's prior enrollment in a payroll prepaid card program and one or more of the following: the consumer's historical direct deposit data, and data associated with the consumer's historical behavior in the payroll card program. The instructions also include enrolling the consumer in the line of credit program through an on-line process responsive to an acceptance of terms and conditions of the line of credit program by the consumer and extending an amount of available credit to the enrolled consumer through the line of credit program. The instructions include receiving authorization for an advance under the line of credit program from the consumer so that the consumer authorizes all advances, assessing a loan advance fee of a predetermined percentage of the value of the advance, receiving loan repayments over one or more predetermined direct deposit periods, and changing the consumer credit limit by preselected increments responsive to a change in the consumer's direct deposit amount.

An embodiment of a system to manage access to a line of credit for a prepaid card, for example, includes a plurality of customer access interface devices and a remote computer server positioned to provide communication with each of the plurality of customer access interface devices, being associated with a financial institution, and having memory. The system also includes program product stored in the memory of the computer server so that the program product operates to perform various instructions, such as determining eligibility for a line of credit program from a financial institution responsive to a consumer's prior enrollment in a payroll prepaid card program and one or more of the following: the consumer's historical direct deposit data, and data associated with the consumer's historical behavior in the payroll card program. The instructions also include enrolling the consumer in the line of credit program through an on-line process responsive to an acceptance of terms and conditions of the line of credit program by the consumer, extending an amount of available credit to the enrolled consumer through the line of credit program, receiving authorization for an advance under the line of credit program from the consumer so that the consumer authorizes all advances, and assessing a loan advance fee of a predetermined percentage of the value of the advance. The instructions also include receiving loan repayments over one or more predetermined direct deposit periods and changing the consumer credit limit by preselected increments responsive to a change in the consumer's direct deposit amount.

The benefits of the embodiments of the present invention include, for example, providing a short-term borrowing alternative that is more cost effective than other expensive financial service products available and more convenient to the consumer. Embodiments of the present invention also allow the combining of product enhancements with other complimentary enhancements and can continue to provide significantly improved services and credit products by banking or other financial institutions with the conveniences of traditional banking products.

BRIEF DESCRIPTION OF DRAWINGS

So that the manner in which the features and benefits of the invention, as well as others which will become apparent, may be understood in more detail, a more particular description of the invention briefly summarized above may be had by reference to the embodiments thereof which are illustrated in the appended drawings, which form a part of this specification. It is also to be noted, however, that the drawings illustrate only various embodiments of the invention and are therefore not to be considered limiting of the invention's scope as it may include other effective embodiments as well.

FIG. 7 is a schematic diagram of a payroll processor system according to an embodiment of the present invention.

DETAILED DESCRIPTION OF INVENTION

Figure 1:
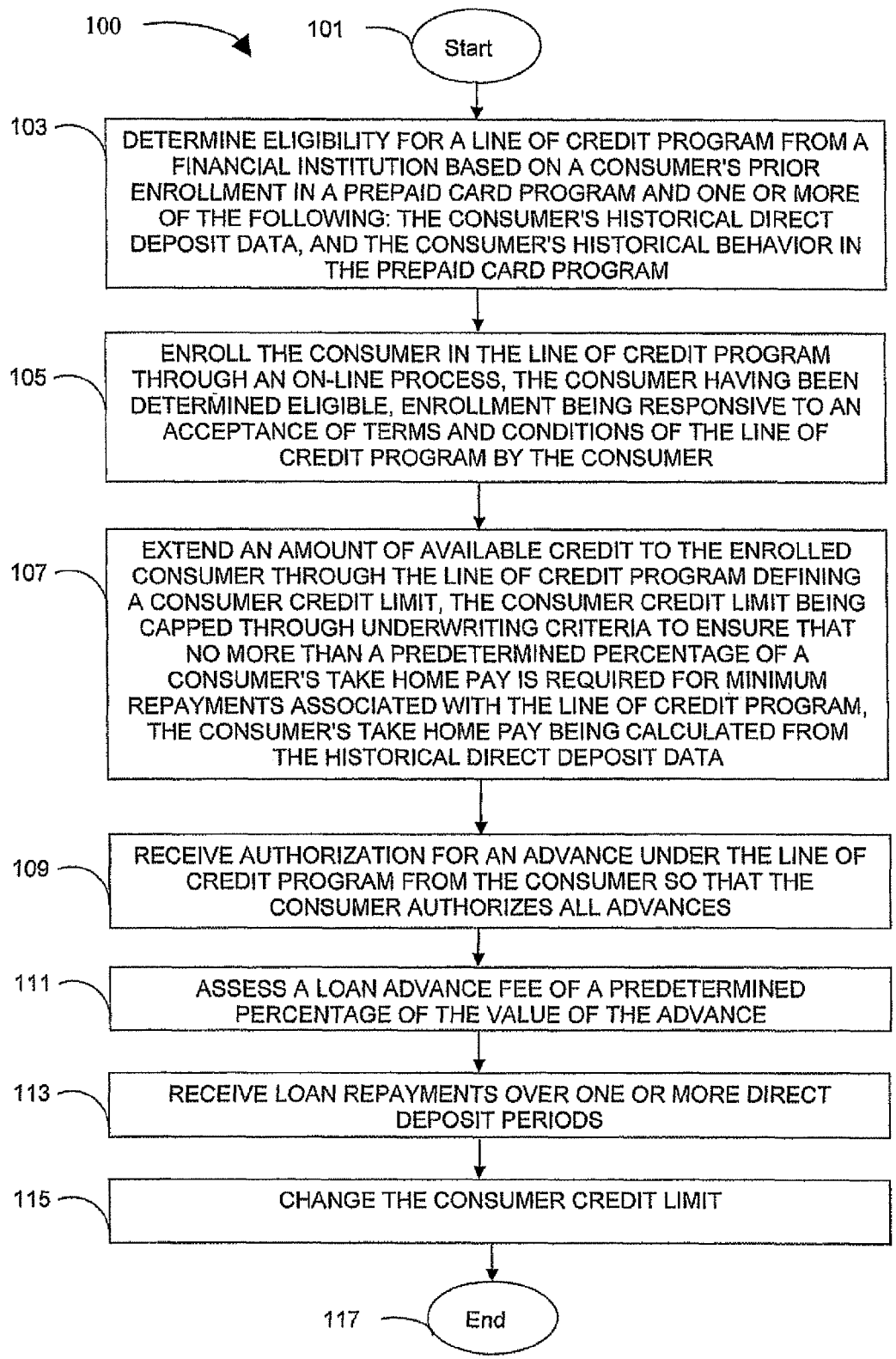
FIG. 1 is a flow diagram of a computer-implemented method of managing access to a line of credit for a prepaid card according to an embodiment of the present invention.

The present invention will now be described more fully hereinafter with reference to the accompanying drawings, which illustrate embodiments of the invention. This invention may, however, be embodied in many different forms and should not be construed as limited to the illustrated embodiments set forth herein; rather, these embodiments are provided so that this disclosure will be thorough and complete, and will fully convey the scope of the invention to those skilled in the art. Like numbers refer to like elements throughout.

Applicants have recognized that historical data associated with an introductory micro-lending and line of credit bank product associated with a payroll prepaid card, including a program that provides funds only in one or more preselected increments, can be analyzed to determine eligibility for enhanced products and programs with more favorable terms to the consumer. A payroll prepaid card is a prepaid card associated with a recurring direct deposit, e.g., an employer's payroll deposit, a federal or state government electronic benefits payment, an annuity, or other stream of payments as understood by those skilled in the art. Typically, payroll funds are loaded on the prepaid card or posted to the prepaid card by a prepaid card processor associated with the prepaid card account. In general, eligibility for a prepaid card requires verification of a minimum age, e.g., 18 years or older, and a government screening process, e.g., by the Office of Foreign Assets Control of the United States Department of the Treasury, to comply with federal regulations, such as, for example, the Patriot Act, as understood by those skilled in the art. The historical data includes, for example, the consumer's use of a line of credit associated with the introductory micro-lending bank product, subsequent repayment history, and historical direct deposit information. According to embodiments of the present invention, a consumer exhibiting a recurring income stream, i.e., direct deposits, for a certain period of time, e.g., six months, and responsible behavior with the introductory micro-lending and line of credit program for a certain period of time, e.g., six months, without late payments, defaults, delinquency, or other such irresponsible behavior as understood by those skilled in the art, can become eligible for a line of credit program with loan terms more favorable to the consumer than an introductory program. In addition, eligibility to the line of credit program can be denied according to embodiments of the present invention if a consumer has a prior charged-off line of credit or an outstanding, unpaid existing line of credit. Advantageously, eligibility does not depend on FICO scores, as understood by those skilled in the art, which Applicants further recognize as at least one source of the problem of credit availability to those underserved by traditional bank products.

The embodiments of the present invention provide a consumer with a line of credit product with higher credit limits with longer payback terms than introductory products as an upgrade or next step in a ladder of products for the consumer demonstrating responsible credit behavior. The introductory product can provide funds only in one or more preselected increments. The embodiments of the present invention do not limit draws to the line of credit in increments, advantageously allowing a consumer to graduate from an increment line of credit product to a non-increment line of credit product.

As illustrated in FIGS. 1-7, embodiments of systems 400, program products 308, 401, 500 and computer-implemented methods 100, 200 of the present invention can be provided through an electronic communication network 309 such as a global communication network like the Internet, World Wide Web, or Web 2.0, through a banking type of network, or through a retail, customer or intranet type of network as understood by those skilled in the art. Program products 308, for example, can be stored on a computer server 307, 403 at bank or financial institution 305 having memory and be accessible by a plurality of computers 301, and each can have their own respective memory 303, as well as operating system and browsing software or program product as desired and as understood by those skilled in the art, at bank customer locations, e.g., customer homes, office, and retail locations.

Embodiments of the present invention provide, for example, for the enrollment of a consumer in the enhanced line of credit program from a bank, a financial institution, or a lending institution through an on-line process. For example, a consumer can access a website or other computer program product 401 from the bank or financial institution 305, located a computer server 307, 403 associated with the bank or financial institution 305, to enroll in the line of credit program using a browser or other software through a computer network 309, through a global communication network such as the Internet or Web 2.0, or through a computer program product stored on a tangible computer readable memory or storage device. Having determined that a consumer is eligible, the enrollment process can include, for example, requesting an e-mail address from the consumer for statement purposes. The enrollment of the consumer in the line of credit program further includes the consumer's acceptance of terms and conditions of the line of credit program through clicking on a button or other such mechanism as understood by those skilled in the art. The terms and conditions of the line of credit program can include a privacy policy as understood by those skilled in the art. The on-line enrollment embodiments of the present invention advantageously provide a convenient and cost effective way for a consumer to register for the line of credit program with the bank or financial institution without having to enter a brick and mortar location during business hours.

Embodiments of the present invention provide, for example, for assessing a loan advance fee of a predetermined percentage, e.g., 10%, of the value of the advance by the computer server 307, 403 so that the loan fee is proportional to the value of the loan and for receiving loan repayments over one or more predetermined direct deposit periods, e.g. 5 periods. In addition, repayment can include an electronic check drawn on the prepaid card account. For example, a loan amount of $500 can have a loan advance fee with a predetermined percentage of 10% of the value of the loan; therefore, the loan advance fee can be $50 (10%×$500=$50). The total $550 ($500 principle+$50 fee) can, for example, be paid back in 5 payments of $110 each using an automatic electronic check. As understood by those skilled in the art, the interest rate and other repayment terms of the embodiments of the present invention can be more favorable and less expensive to the consumer than introductory line of credit products.

Embodiments of the present invention provide, for example, for receiving authorization for an advance under the line of credit program from the consumer by the computer server 307, 403 so that the consumer authorizes all advances. There are no automatic advances. Authorization can conveniently include a written correspondence from the customer, a customer selection on a website, a telephone conversation with an interactive voice response unit (IVRU), a telephone conversation with a customer service representative, an interaction using mobile phone, or a combination of these as understood by those skilled in the art, allowing a customer to obtain a loan without the need to walk into a brick and mortar location. Similarly, embodiments of the present invention provide, for example, for cancelling an advance through a call to a customer service center by the computer server 307, 403.

Embodiments of the present invention provide, for example, for extending an amount of credit to the enrolled consumer by the computer server 307, 403 through the line of credit program. The amount of credit extended defines a consumer credit limit. The consumer credit limit is capped through underwriting criteria to ensure that no more than a predetermined percentage of a consumer's historic direct deposit amount, or take home pay, is required for minimum repayments associated with the line of credit program. In addition, embodiments of the present invention can, for example, provide for a maximum allowable consumer credit limit that is less than the cap determined by the underwriting criteria. That is, the line of credit program embodiments of the present invention can include a ceiling, e.g., $1,000, on the amount credit available to any consumer. For example, if a consumer's historic direct deposit amount or take home pay were such that the underwriting criteria were to suggest a consumer credit limit of, e.g., $1,500, but the maximum allowable consumer credit limit under the program is, e.g., $1,000, then the credit limit for the consumer can be, e.g., $1,000, despite the underwriting writing criteria.

Embodiments of the present invention provide, for example, for increasing or decreasing the consumer credit limit by the computer server 307, 403 in predetermined increments, e.g., $100 increments, and for notifying the consumer of changes in the consumer credit limit through e-mail, traditional mail, or both. If the consumer gets a raise or otherwise experiences an increase in take home pay, the consumer credit limit can be increased. If the consumer's take home pay is lowered by wages being garnished by the employer or otherwise, the consumer credit limit can be decreased. The changes in the consumer credit limit by the computer server 307, 403 can be immediate and automatic, responsive to changes with the direct deposit.

Embodiments of the present invention provide, for example, for active monitoring of the line of credit program by the computer server 307, 403 and suspending the consumer's access to funds in the event of irresponsible or risky behavior. Such behavior can include, for example, a missed payment, an interruption in direct deposits, a negative card balance, a preselected threshold number of consecutive loans from the line of credit program within a preselected time period, or a combination thereof as understood by those skilled in the art. While the embodiments of the present invention reward responsible behavior by the consumer with more favorable loan terms, the embodiments also deny access to the favorable terms in the event of irresponsible behavior, protecting the lender from further risk exposure and protecting the consumer from the effects additional over-borrowing.

Embodiments of the present invention advantageously provide consumer protection for the line of credit product, as well as monitoring, control, and management by a bank, which can be a significant benefit from the perspective of the customer, regulators, and public opinion through consumer activists. The financial institution can be, for example, a federally chartered bank according to embodiments of the present invention. In addition, the line of credit program can be bank product, with monthly statements documenting all fees assessed, so that the line of credit program complies with federal Regulation Z, as understood by those skilled in the art.

Figure 6:
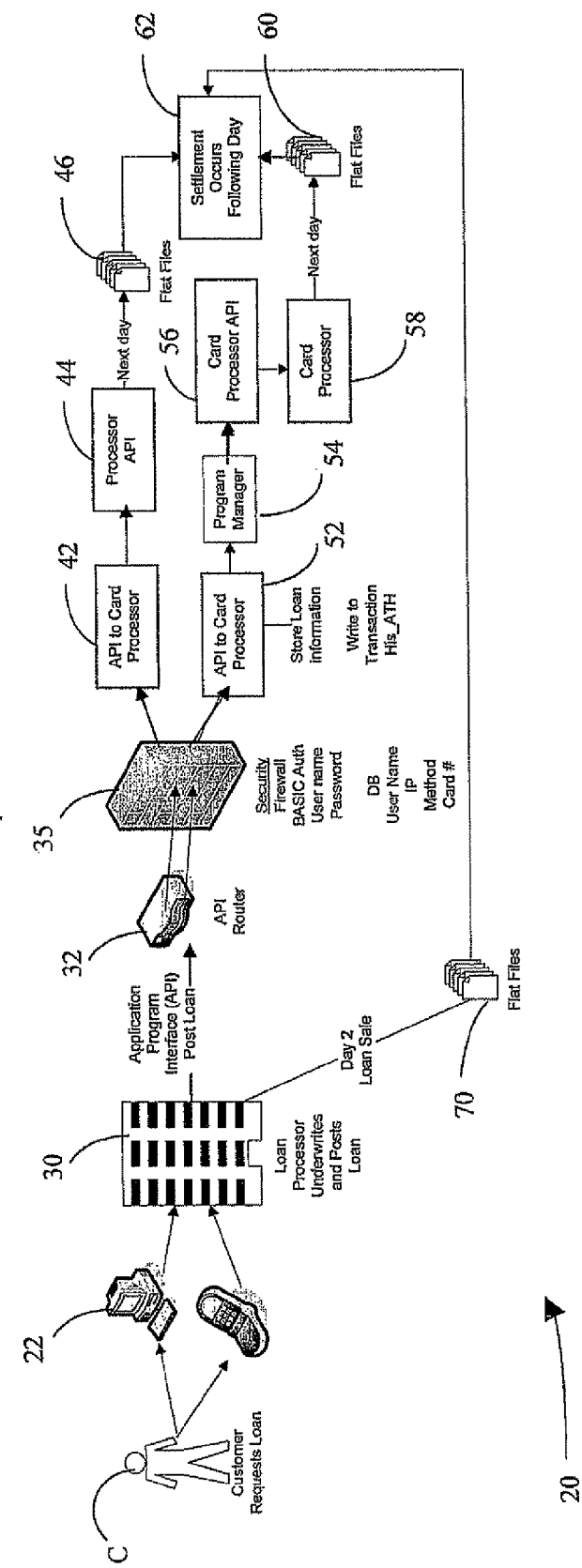
FIG. 6 is a schematic diagram of loan set up flow according to embodiments of the present invention.

For example, as illustrated in FIG. 6, a customer C can go on-line through a computer or IVRU 22 in a system 20 to register at a website using a program product according to embodiments of the present invention and launched from a server, e.g., at a loan processor, underwriting organization, bank, lending institution, other financial institution, payroll processing company, or other entity which can provide the line of credit product, among others, as will be understood by those skilled in the art. The form or qualification parameters can be consistent with one or more underwriting organizations or institutions or set/defined by the bank or lending institution.

As understood by those skilled in the art, a loan, micro-loan, repayment, line of credit, or other type of payment processor, such as provided by First Data Corp., Total Systems, Inc., Fidelity National Information, Inc., or as custom developed by a bank, a financial institution, or other organization, operates to provide a customer interface on a line of credit or micro-loan request and determines an decides whether a potential or existing customer qualifies for a line of credit product. This line of credit or loan processor 315, for example, can be outsourced by a bank if desired, and numerous different loan processors or entities that handle this function can be used as well (see, e.g., FIG. 3 with computer server 315 handling the payment processor and interface access roles for customer lines of credit 317, for example). If the customer qualifies, the credentials can be passed to a bank or other financial institution 305 or other organization, and then a flag, code, notation, or other identifier can be associated with a customer's profile so that when the customer desires to access the line of credit, e.g., through a customer purchase transaction using the prepaid card, the process acknowledges the identifier to then allow incremental micro-loans on the line of credit to be granted as described herein. Notably, often a loan or other type of payment processor is card processor specific, and in this instance, a dedicated card processor (see, e.g., prepaid card processor 311 in FIG. 3, and this processor likewise can be associated with computers and have a customer prepaid card account 313 associated with or processed thereby as understood by those skilled in the art) can be used, but also as shown in FIG. 6 and described further in U.S. Provisional Patent Application Ser. No. 61/029,975 titled "Methods To Advance Loan Proceeds on Prepaid Cards, Associated Systems and Computer Program Products" filed on Feb. 20, 2008 and incorporated herein by reference methods can be used as well to handle card interface to a variety of card processors (e.g., Metavante Corporation ("Metavante") of Milwaukee, Wis.) as understood by those skilled in the art.

The customer transaction using a prepaid card, for example, can then cause the request for the loan advance through the line of credit processor or other payment processor. The credit processor then posts notification of the micro-loan request through an API Post to post the loan advance in real time through an API Router 32 as understood by those skilled in the art. The API Router 32 passes the request through a security firewall 35 which passes the request through the API to a card processor 42, such as Metavante, and Process to APT 44. This information can be compared to flat files 46, 60, 70, e.g., data files that have no structural relationship as understood by those skilled in the art, or flat files database and the bank or institution reconciles the loan transaction with the customer's line of credit or other account 62. Some card processors, for example, provide additional processor interfaces or allow development of additional processor interfaces, as understood by those skilled in the art, (see, e.g., API to Program Manager 52 (e.g., Program Manager operations, for example, can be provided by various financial solution/program management companies, such as AccountNow of San Ramon, Calif., as understood by those skilled in the art), program manager 54, and Program Manager API 56) such as Metavante card processor 58 should such processor be used by the credit processor or other payment processor for a customer transaction.

Embodiments of systems, program products, and computer-implemented methods of the present invention can include, for example, for substantially all programs if desired, features such as any repayment of draws on the line of credit can be automatically collected from the next several electronic deposits regardless of payment source. As payments are received, fees also can be paid first then the payment applied to the oldest outstanding draw amount. When payments are received, total available line limit is restored by the payment amount. If finds from the electronic deposit are not sufficient to cover the expected payment, a partial repayment can be made in the fall amount of the electronic deposit resulting in an unpaid balance on the line. Repayment of the remaining unpaid balance can be taken from subsequent electronic deposits until the line has been paid in full. Other cash equivalent repayment options also can be accepted and processed by a line of credit processor as understood by those skilled in the art.

It will also be understood by those skilled in the art that embodiments of the line of credit product or program product, for example can be associated with a payroll processing company that processes direct deposits (see, e.g., FIG. 7). Embodiments of the program product and computer-implemented methods can be added to product or service offerings by the payroll processing company 710 so that it can be offered to their customers independent of bank or product (DDA or payroll card), by taking money or funds out at the source 710, e.g., as the payroll file is prepared 720 and before the direct deposit is even originated, or loaded onto a prepaid card, for example, 52, so that loan repayment from direct deposit funds occurs prior to the direct deposit funds being made available in the consumer's account. These embodiments can also allow the processing company 710 to have more direct information on employment history. A payroll processing company 710 can also use a loan processing system 740, loan processor, or other payment processor either within their facilities or as an outsourcing entity to allow the provision of enrolling and providing customer payroll information 724 and for tracking and reconciling repayment or updated customer payroll information with repayments pulled 744. The payroll can be sent, loaded or processed by a payroll processor 730 for ACH transmittal, check generation, or card loading/providing, for example (see, e.g., FIG. 7). These embodiments of associated computer-implemented methods, for example, can include providing a prepaid card to an employee who gets direct deposit to a DDA whereby the consumer borrow funds from the service/product and has those funds direct deposited onto the card instantly and repaid by pulling finds from the direct deposit file prior to sending to the other bank account to repay the amount withdrawn. An example of and more details on how repayment can be accomplished is illustrated in U.S. Provisional Patent Application Ser. No. 61/016,213 titled "Transfer Account Systems, Computer Program Products, and Associated Methods" filed on Dec. 21, 2007 which is incorporated herein by reference in its entirety.

Additionally, along these lines, any repayment of a line supersedes repayment of a negative balance on a card due to force posts or settlement transactions that cause the card to go negative. Any monies remaining after a payment is received can be credited to the prepaid card account. If payment takes the card balance to $0, any transactions attempted with the card can be declined. Those transactions can be subject to any related decline fees. Repayment of a draw, for example, should not be taken from the principal balance on a card. That is, if a card balance is positive prior to a draw, only when the next electronic deposit is initiated to the card will repayment be triggered. If a draw is not paid within the preselected time period, preferably days, e.g., 35 day timeframe, any amount owed can be taken from the principal balance on a card.

In an embodiment of a computer-implemented method 100 of advancing funds using a prepaid card to a customer of a retailer, as illustrated in FIG. 1, the computer-implemented method 100 includes determining eligibility for a line of credit program from a financial institution responsive to a consumer's prior enrollment in a payroll prepaid card program and one or more of the following: the consumer's historical direct deposit data, and data associated with the consumer's historical behavior in the payroll card program 103. The computer-implemented method also includes enrolling the consumer in the line of credit program through an on-line process, the consumer having been determined eligible, enrollment being responsive to an acceptance of terms and conditions of the line of credit program by the consumer 105. The computer-implemented method further includes extending an amount of available credit to the enrolled consumer through the line of credit program defining a consumer credit limit, the consumer credit limit being capped through underwriting criteria to ensure that no more than a predetermined percentage of a consumer's historic direct deposit amount is required for minimum repayments associated with the line of credit program 107. The computer-implemented method also includes receiving authorization for an advance under the line of credit program from the consumer by the computer server 307, 403 so that the consumer authorizes all advances 109 and assessing a loan advance fee of a predetermined percentage of the value of the advance 111. The computer-implemented method further includes receiving loan repayments over one or more predetermined direct deposit periods 113 and changing the consumer credit limit 115.

The computer-implemented method can fierier include notifying the consumer of changes in the consumer credit limit through one or more of the following: e-mail, and traditional mail. The computer-implemented method can include cancelling an advance through a call to a customer service center by the computer server 307, 403 and suspending access to funds under the line of credit program if one or more of the following events occur: a missed payment, an interruption in direct deposits, a negative card balance, and a preselected threshold number of consecutive loans from the line of credit program.

Figure 2:
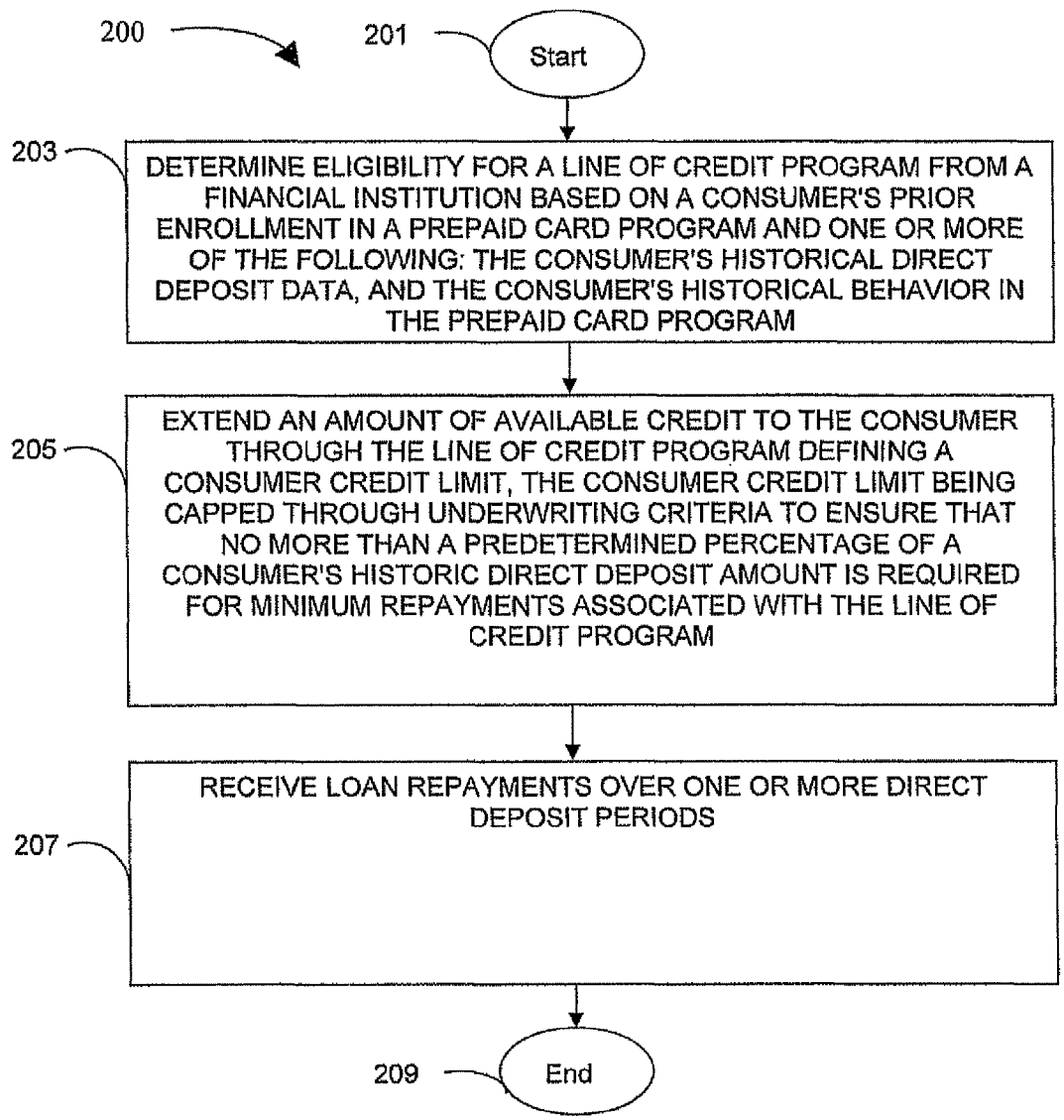
FIG. 2 is a flow diagram of a computer-implemented method of managing access to a line of credit for a prepaid card according to an embodiment of the present invention.
Figure 3:
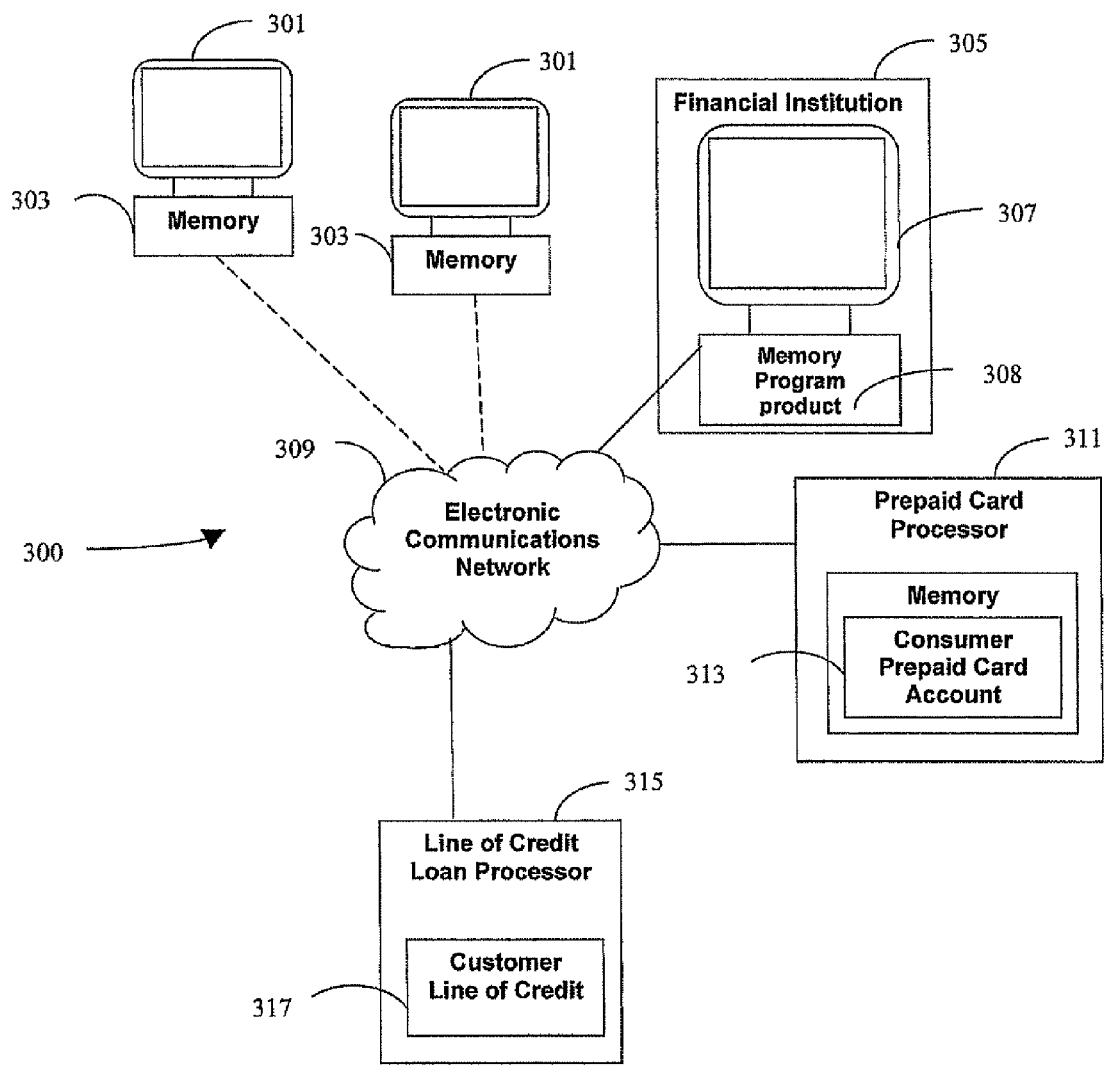
FIG. 3 is a schematic diagram of a system to advance funds to a customer of a retailer according to an embodiment of the present invention.

In an embodiment of a computer-implemented method of advancing funds using a prepaid card to a customer of a retailer, as illustrated in FIG. 2, the computer-implemented method 200 includes determining eligibility for a line of credit program from a financial institution by the computer server 307, 403 responsive to a consumer's prior enrollment in a payroll prepaid card program and one or more of the following: the consumer's historical direct deposit data, and data associated with the consumer's historical behavior in the payroll card program 203. The computer-implemented method also includes extending an amount of available credit to the consumer by the computer server 307, 403 through the line of credit program defining a consumer credit limit, the consumer credit limit being capped through underwriting criteria to ensure that no more than a predetermined percentage of a consumer's historic direct deposit amount is required for minimum repayments associated with the line of credit program 205. The computer-implemented method further includes receiving loan repayments over one or more predetermined direct deposit periods 207.

Method embodiments of the present invention can advantageously be implemented by a computer as understood by those skilled in the art.

An embodiment of a system 300 to advance finds to a customer of a retailer, as illustrated in FIGS. 3-7, for example, includes a plurality of customer access interface devices 301 and a remote computer server 307 positioned to provide communication with each of the plurality of customer access interface devices 301, being associated with a financial institution 305, and having memory. The system also includes program product 308, 401, 500 stored in the memory of the computer server so that the program product operates to perform various instructions, such as determining eligibility for a line of credit program from a financial institution responsive to a consumer's prior enrollment in a payroll prepaid card program and one or more of the following: the consumer's historical direct deposit data, and data associated with the consumer's historical behavior in the payroll card program. The instructions can also include enrolling the consumer in the line of credit program through an on-line process, the consumer having been determined eligible, enrollment being responsive to an acceptance of terms and conditions of the line of credit program by the consumer. The instructions can further include extending an amount of available credit to the enrolled consumer through the line of credit program defining a consumer credit limit, the consumer credit limit being capped through underwriting criteria to ensure that no more than a predetermined percentage of a consumer's historic direct deposit amount is required for minimum repayments associated with the line of credit program. The instructions can also include receiving authorization for an advance under the line of credit program from the consumer so that the consumer authorizes all advances, assessing a loan advance fee of a predetermined percentage of the value of the advance, receiving loan repayments over one or more predetermined direct deposit periods, and changing the consumer credit limit by preselected increments responsive to a change in the consumer's direct deposit amount.

The system can also include a second computer associated with a customer prepaid card account 313 defining a prepaid card processor 311. The prepaid card processor 311 is in communication with the financial institution computer server 307 through an electronic communications network 309. As understood by those skilled in the art, the electronic communication network 309 can be a global communication network like the Internet, World Wide Web, or Web 2.0; a banking type of network; or a retail, customer or intranet type of network.

Figure 4:
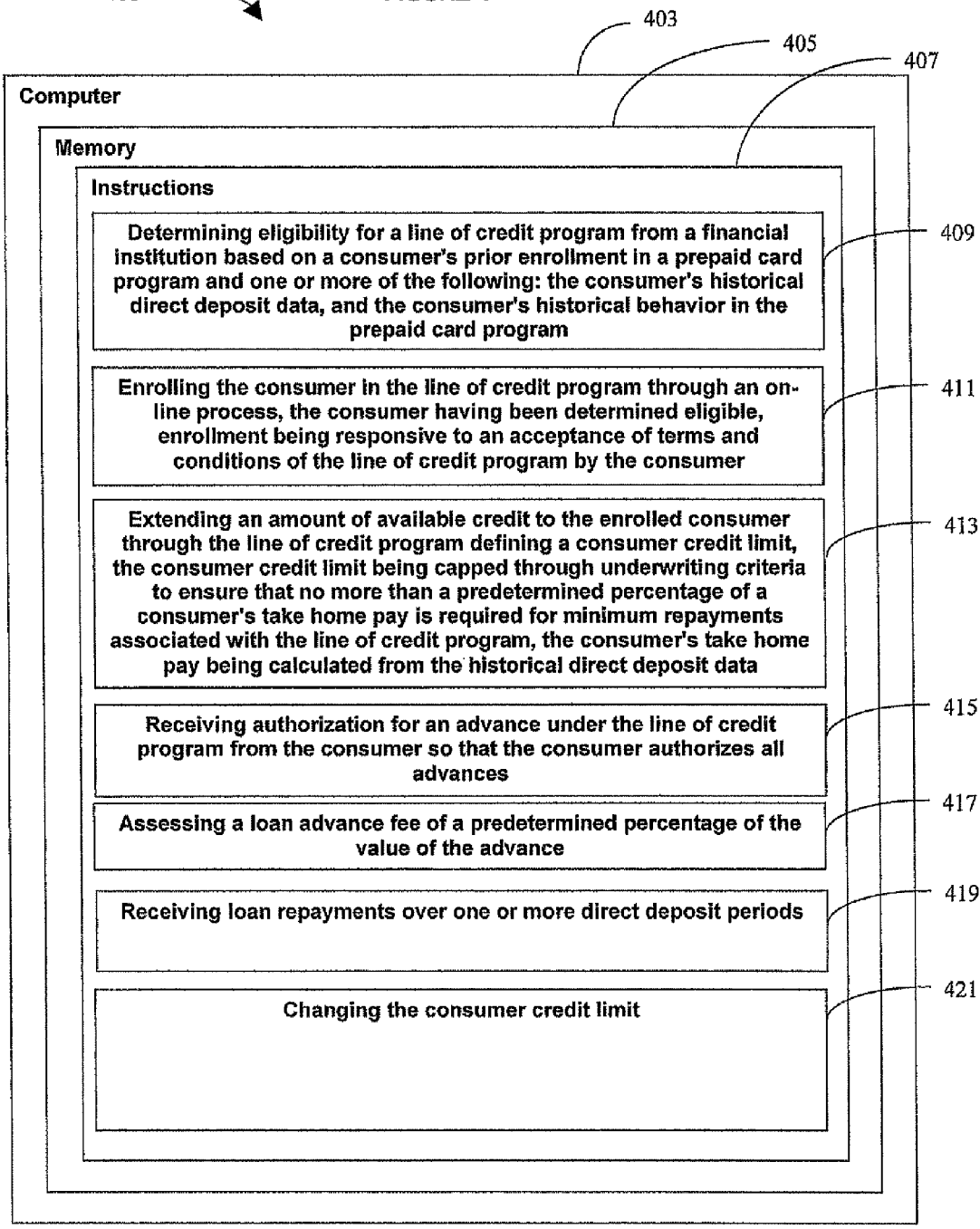
FIG. 4 is a schematic diagram of a computer server having program product stored in memory thereof according to an embodiment of the present invention.

In an embodiment of a program product 401 stored in one or more tangible computer readable media 405 and readable by a computer 403, as illustrated in FIG. 4, for example, the program product 401 can operate to perform the various instructions 407 when read by the computer 403, such as determining eligibility for a line of credit program from a financial institution responsive to a consumer's prior enrollment in a payroll prepaid card program and one or more of the following: the consumer's historical direct deposit data, and data associated with the consumer's historical behavior in the payroll card program 409. The instructions can also include enrolling the consumer in the line of credit program through an on-line process, the consumer having been determined eligible, enrollment being responsive to an acceptance of terms and conditions of the line of credit program by the consumer 411. The instructions can further include extending an amount of available credit to the enrolled consumer through the line of credit program defining a consumer credit limit, the consumer credit limit being capped through underwriting criteria to ensure that no more than a predetermined percentage of a consumer's historical direct deposit amount is required for minimum repayments associated with the line of credit program 413. The instructions can include receiving authorization for an advance under the line of credit program from the consumer so that the consumer authorizes all advances 415, assessing a loan advance fee of a predetermined percentage of the value of the advance 417, receiving loan repayments over one or more predetermined direct deposit periods 419, and changing the consumer credit limit by preselected increments responsive to a change in the consumer's direct deposit amount 421.

The program product can further operate to perform the instructions of: notifying the consumer of changes in the consumer credit limit through one or more of the following: e-mail, and traditional mail; suspending access to funds under the line of credit program if one or more of the following events occur: a missed payment, an interruption in direct deposits, a negative card balance, and a preselected threshold number of consecutive loans from the line of credit program; and cancelling an advance through a call to a customer service center.

Figure 5:
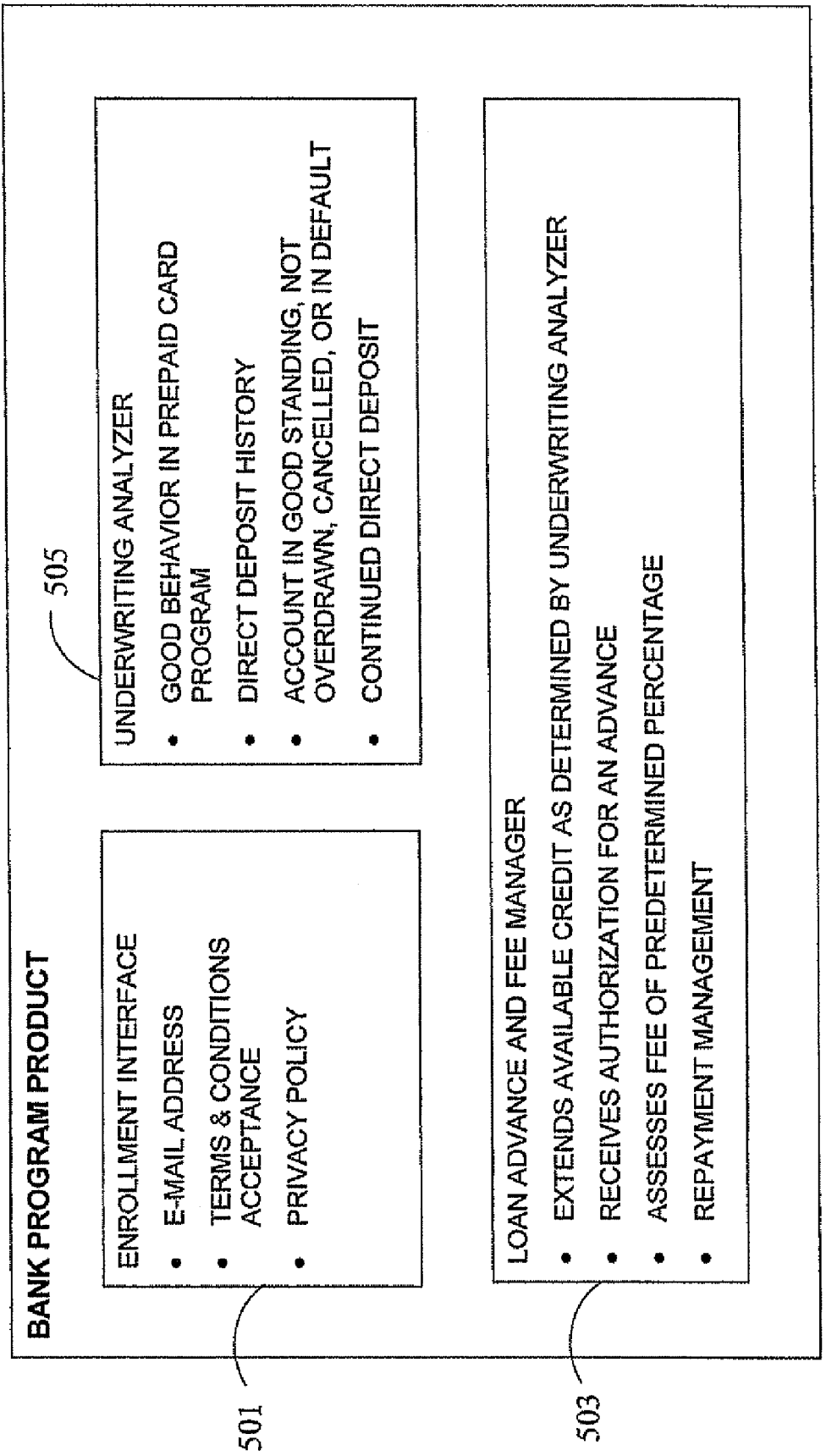
FIG. 5 is a schematic diagram of a program product according to an embodiment of the present invention.

Embodiments of the present invention provide, for example, for a program product 500 associated with a bank or other financial or lending institution implemented in modules or components, as illustrated in FIG. 5. An enrollment interface module 501 can, for example, can provide an on-line process for enrollment, requiring the consumer to accept terms and conditions of the line of credit program, including, for example, a privacy policy, and requesting an e-mail address for statement purposes. An underwriting analyzer component 505 of a bank program product 500 can receive underwriting information and make the determine whether to offer a line of credit or other product to the customer as understood by those skilled in the art. Favorable underwriting information can include, for example, good behavior in a prepaid card program, direct deposit history, an account in good standing, not overdrawn, cancelled, or default, and continued direct deposit, as understood by those skilled in the art. In addition, the underwriting analyzer embodiments of the present invention can determine a credit limit responsive to a direct deposit history, as described herein and as understood by those skilled in the arts. Also, a loan advance and fee manager module 503 deals with extending available credit as determined by the underwriting analyzer 505, receiving authorization from a customer for an advance, determining whether to advance finds, providing loans, assessing a fee of a predetermined percentage of the loan advance amount, calculating available credit, managing repayments, and other associated tasks as understood by those skilled in the art. Other architectures and organizations will be understood by those skilled in the art to be included within the embodiments of the present invention. Program products and computerized or computer-implemented methods can be implemented in a variety of software and programming languages, including without limitation hypertext markup language ("HTML"), Java, C, C++, XML, and others as understood by those skilled in the art.

A person having ordinary skill in the art will recognize that various types of memory are readable by a computer such as described herein, e.g., bank computer, computer server, financial institution computer, prepaid card processors, or other computers with embodiments of the present invention. Examples of computer readable media include but are not limited to: nonvolatile, hard-coded type media such as read only memories (ROMs), CD-ROMs, and DVD-ROMs, or erasable, electrically programmable read only memories (EEPROMs), recordable type media such as floppy disks, hard disk drives, CD-R/RWs, DVD-RAMs, DVD-R/RWs, DVD+R/RWs, flash drives, memory sticks, and other newer types of memories, and transmission type media such as digital and analog communication links. For example, such media can include operating instructions, as well as instructions related to the system and the method steps described above and can operate on a computer. It will be understood by those skilled in the art that such media can be at other locations instead of or in addition to the locations described to store program products, e.g., including software, thereon. Embodiments of a system to advance funds to a customer, for example, can include a plurality of customer access interface devices as illustrated and described herein and one or more remote computer servers positioned to provide communication with each of the plurality of customer access interface devices and being associated with a financial institution. Each of these computer servers, for example, can having one or more of these various types of memory as understood by those skilled in the art.

This application claims priority to and the benefit of: U.S. Provisional Patent Application Ser. No. 61/016,213, by Sorbe et al., titled "Transfer Account Systems, Computer Program Products, and Associated Methods" filed Dec. 21, 2007; U.S. Provisional Patent Application Ser. No. 61/052,454, by Sorbe et al., titled "Transfer Account Systems, Computer Program Products, and Methods to Prioritize Payments from Preselected Bank Account" filed May 12, 2008; U.S. Provisional Patent Application Ser. No. 61/029,975, by Sorbe et al., titled "Methods To Advance Loan Proceeds On Prepaid Cards, Associated Systems and Computer Program Products" filed on Feb. 20, 2008; U.S. Provisional Patent Application Ser. No. 61/042,612, by Ahlers et al., titled "System, Program Product, and Associated Methods To Autodraw for Micro-Credit Attached to a Prepaid Card" filed on Apr. 4, 2008; U.S. Provisional Patent Application Ser. No. 61/042,624, by Crowe et al., titled "System, Program Product, and Method To Authorize Draw for Retailer Optimization" filed on Apr. 4, 2008; U.S. Provisional Patent Application Ser. No. 61/032,750, by Ahlers et al., titled "Methods, Program Product, and System for Micro-Loan Management" filed on Feb. 29, 2008; U.S. Provisional Patent Application Ser. No. 61/060,559, by Galit et al., titled "Methods, Program Product, and System to Enhance Banking Terms Over Time" filed on Jun. 11, 2008; U.S. Provisional Patent Application Ser. No. 61/082,863, by Ahlers et al., titled "System, Program Product, and Method For Debit Card and Checking Account Autodraw" filed on Jul. 23, 2008; U.S. Provisional Patent Application Ser. No. 61/053,056, by Galit et al., titled "System, Program Product, and Method For Loading a Loan On a Pre-Paid Card" filed on May 14, 2008, all of which are each incorporated herein by reference in their entireties. This application also relates to U.S. patent application Ser. No. 12/338,365, by Sorbe et al., titled "Transfer Account Systems, Computer Program Products, and Associated Computer-Implemented Methods" filed on the same day as this application, Dec. 18, 2008; U.S. patent application Ser. No. 12/338,402, by Sorbe et al., titled "Transfer Account Systems, Computer Program Products, and Associated Computer-Implemented Methods" filed on the same day as this application, Dec. 18, 2008; U.S. patent application Ser. No. 12/338,440, by Sorbe et al., titled "Transfer Account Systems, Computer Program Products, and Associated Computer-Implemented Methods" filed on the same day as this application, Dec. 18, 2008; U.S. patent application Ser. No. 12/338,584, by Sorbe et al., titled "Transfer Account Systems, Computer Program Products, and Computer-Implemented Methods to Prioritize Payments from Preselected Bank Account" filed on the same day as this application, Dec. 18, 2008; U.S. patent application Ser. No. 12/338,465, by Sorbe et al., titled "Transfer Account Systems, Computer Program Products, and Computer-Implemented Methods to Prioritize Payments from Preselected Bank Account" filed on the same day as this application, Dec. 18, 2008; U.S. patent application Ser. No. 12/338,684, by Ahlers et al., titled "Computer-Implemented Methods, Program Product, and System for Micro-Loan Management" filed on the same day as this application, Dec. 18, 2008, all of which are each incorporated herein by reference in their entireties.

Many modifications and other embodiments of the invention will come to the mind of those skilled in the art having the benefit of the teachings presented in the foregoing descriptions and the associated drawings. Therefore, it is to be understood that the invention is not to be limited to the illustrated embodiments disclosed, and that modifications and other embodiments are intended to be included within the scope of the appended claims.

What is claimed is:

1. A computer associated with a financial institution defining a financial institution computer to access to a line of credit associated with a prepaid card account, the financial institution computer comprising:

an input/output unit for communicating with a plurality of customer access interface devices;

one or more processors; and one or more non-transitory memories encoded with computer program, the computer program comprising a set of instructions that, when executed by the one or more processors, perform the operations of:

determining whether a consumer has one or more of a plurality of existing prepaid card accounts;

determining eligibility for a line of credit account with a financial institution based on the consumer's historical use of the one or more of the plurality of existing prepaid card accounts;

establishing a line of credit account associated with the one or more of the plurality of exiting prepaid card accounts responsive to determining the consumer's eligibility, the line of credit account having a total credit limit and adapted to be drawn in at least one of a plurality of separate predetermined loan increments each being equal in value and less than the total credit limit, the total credit limit being capped through underwriting criteria so that no more than a predetermined percentage of the consumer's historic direct deposit amount to the one or more of the plurality of existing prepaid card accounts is required for a minimum repayment amount;

determining a number of separate predetermined loan increments to be added to the one or more of the plurality of existing prepaid card accounts from the line of credit account responsive to receiving a request from one or more of the plurality of customer access interface devices for draws from the line of credit account;

loading the one or more of the plurality of existing prepaid card accounts with at least one of the plurality of separate predetermined loan increments that corresponds with the number of separate predetermined loan increments to thereby define loaded increments responsive to the loaded increments being equal to or less than an available balance of the line of credit account;

determining a total value of a loan advance fee for the loaded increments, the total value being equal to a predetermined loan advance fee multiplied by the number of separate predetermined loan increments, the total value of the loan advance fee being less than a value of the loaded increments;

determining a plurality of loan repayment portions for a total loan amount based upon a plurality of predetermined direct deposit periods, the total loan amount defined as the total value of the loan advance fee plus the loaded increments, each of the plurality of loan repayment portions exceeding the minimum repayment amount; and deducting one of the plurality of loan repayment portions from a direct deposit received in the one or more of the plurality of existing prepaid card account during each of the plurality of predetermined direct deposit periods.

2. A financial institution computer as defined in claim 1, wherein the computer program further comprises instructions that, when executed by the one or more processors, perform the operation of:

increasing the total credit limit of the line of credit account by a second number of separate predetermined loan increments to thereby increase existing available credit for the consumer responsive to a change in the consumer's direct deposit to the one or more the plurality of existing prepaid card accounts, the increased available credit adapted to be drawn in at least one of the plurality of separate predetermined loan increments.

3. A financial institution computer as defined in claim 1, wherein the computer program further comprises instructions that, when executed by the one or more processors, perform the operations of:

reducing the total credit limit of the line of credit account by a second number of separate predetermined loan increments to thereby decrease existing available credit for the consumer responsive to a change in the consumer's direct deposit to the one or more the plurality of existing prepaid card accounts, the reduced available credit adapted to be drawn in at least one of the plurality of separate predetermined loan increments.

4. A financial institution computer as defined in claim 1, wherein each of the one of the plurality of loan repayment portions are equal in value; and wherein determining eligibility for the line of credit further includes requiring a minimum age and a government screening process.

5. A financial institution computer as defined in claim 1, wherein the computer program further comprises instructions that, when executed by the one or more processors, perform the operation of canceling a draw from the line of credit account through a call to a customer service center; and wherein the one of the plurality of loan repayment portions are deducted from the directed deposit prior to the direct deposit funds being made available to the consumer.

6. A financial institution computer as defined in claim 1, wherein the financial institution is a federally chartered bank and the line of credit is a bank product.

7. A non-transitory computer-readable medium encoded with a computer program and operable on a computer associated with a financial institution defining a financial institution, the computer program operable to access a line of credit associated with a prepaid card account and comprising instructions that, when executed by the computer, perform the operations of:

determining whether a consumer has one or more of a plurality of existing prepaid card accounts;

determining eligibility for a line of credit account with a financial institution based on the consumer's historical use of the one or more of the plurality of existing prepaid card accounts;

establishing a line of credit account associated with the one or more of the plurality of exiting prepaid card accounts responsive to determining the consumer's eligibility, the line of credit account having a total credit limit and adapted to be drawn in at least one of a plurality of separate predetermined loan increments each being equal in value and less than the total credit limit, the total credit limit being capped through underwriting criteria so that no more than a predetermined percentage of the consumer's historic direct deposit amount to the one or more of the plurality of existing prepaid card accounts is required for a minimum repayment amount;

determining a number of separate predetermined loan increments to be added to the one or more of the plurality of existing prepaid card accounts from the line of credit account responsive to receiving a request from one or more of the plurality of customer access interface devices for draws from the line of credit account;

loading the one or more of the plurality of existing prepaid card accounts with at least one of the plurality of separate predetermined loan increments that corresponds with the number of separate predetermined loan increments to thereby define loaded increments responsive to the loaded increments being equal to or less than an available balance of the line of credit account;

determining a total value of a loan advance fee for the loaded increments, the total value being equal to a predetermined loan advance fee multiplied by the number of separate predetermined loan increments, the total value of the loan advance fee being less than a value of the loaded increments; and determining a plurality of loan repayment portions for a total loan amount based upon a plurality of predetermined direct deposit periods, the total loan amount defined as the total value of the loan advance fee plus the loaded increments, each of the plurality of loan repayment portions exceeding the minimum repayment amount.

8. A non-transitory computer-readable medium as defined in claim 7, the computer program further comprising the instruction of:

deducting one of the plurality of loan repayment portions from a direct deposit received in the one or more of the plurality of existing prepaid card account during each of the plurality of predetermined direct deposit periods.

9. A non-transitory computer-readable medium as defined in claim 7, the computer program further comprising instruction of:

increasing the total credit limit of the line of credit account by a second number of separate predetermined loan increments to thereby increase existing available credit for the consumer responsive to a change in the consumer's direct deposit to the one or more the plurality of existing prepaid card accounts, the increased available credit adapted to be drawn in at least one of the plurality of separate predetermined loan increments.

10. A non-transitory computer-readable medium as defined in claim 7, the computer program further comprising instruction of:

reducing the total credit limit of the line of credit account by a second number of separate predetermined loan increments to thereby decrease existing available credit for the consumer responsive to a change in the consumer's direct deposit to the one or more the plurality of existing prepaid card accounts, the reduced available credit adapted to be drawn in at least one of the plurality of separate predetermined loan increments.

11. A non-transitory computer-readable medium as defined in claim 8, wherein each of the one of the plurality of loan repayment portions are equal in value; and wherein determining eligibility for the line of credit further includes requiring a minimum age and a government screening process.

12. A non-transitory computer-readable medium as defined in claim 7, the computer program further comprising instruction of canceling a draw from the line of credit account through a call to a customer service center; and wherein the one of the plurality of loan repayment portions are deducted from the directed deposit prior to the direct deposit funds being made available to the consumer.

13. A non-transitory computer-readable medium as defined in claim 7, wherein the financial institution is a federally chartered bank and the line of credit is a bank product.

14. A computer-implemented method of accessing a line of credit associated with a prepaid card account, the method comprising the steps of:

determining, by a computer associated with a financial institution to define a financial institution computer, whether a consumer has one or more of a plurality of existing prepaid card accounts;

determining, by the financial institution computer, eligibility for a line of credit account with the financial institution based on the consumer's historical use of the one or more of the plurality of existing prepaid card accounts;

establishing, by the financial institution computer, a line of credit account associated with the one or more of the plurality of exiting prepaid card accounts responsive to determining the consumer's eligibility, the line of credit account having a total credit limit and adapted to be drawn in at least one of a plurality of separate predetermined loan increments each being equal in value and less than the total credit limit, the total credit limit being capped through underwriting criteria so that no more than a predetermined percentage of the consumer's historic direct deposit amount to the one or more of the plurality of existing prepaid card accounts is required for a minimum repayment amount;

determining, by the financial institution computer, a number of separate predetermined loan increments to be added to the one or more of the plurality of existing prepaid card accounts from the line of credit account responsive to receiving a request from one or more of the plurality of customer access interface devices for draws from the line of credit account;

loading, by the financial institution computer, the one or more of the plurality of existing prepaid card accounts with at least one of the plurality of separate predetermined loan increments that corresponds with the number of separate predetermined loan increments to thereby define loaded increments responsive to the loaded increments being equal to or less than an available balance of the line of credit account; and determining, by the financial institution computer, a total value of a loan advance fee for the loaded increments, the total value being equal to a predetermined loan advance fee multiplied by the number of separate predetermined loan increments, the total value of the loan advance fee being less than a value of the loaded increments.

15. A computer-implemented method as defined in 14, the method further comprising:

determining, by the financial institution computer, a plurality of loan repayment portions for a total loan amount based upon a plurality of predetermined direct deposit periods, the total loan amount defined as the total value of the loan advance fee plus the loaded increments, each of the plurality of loan repayment portions exceeding the minimum repayment amount.

16. A computer-implemented method as defined in 14, the method further comprising:

deducting, by the financial institution computer, one of the plurality of loan repayment portions from a direct deposit received in the one or more of the plurality of existing prepaid card account during each of the plurality of predetermined direct deposit periods.

17. A computer-implemented method as defined in 14, the method further comprising:

increasing, by the financial institution computer, the total credit limit of the line of credit account by a second number of separate predetermined loan increments to thereby increase existing available credit for the consumer responsive to a change in the consumer's direct deposit to the one or more the plurality of existing prepaid card accounts, the increased available credit adapted to be drawn in at least one of the plurality of separate predetermined loan increments.

18. A computer-implemented method as defined in 14, the method further comprising:

reducing, by the financial institution computer, the total credit limit of the line of credit account by a second number of separate predetermined loan increments to thereby decrease existing available credit for the consumer responsive to a change in the consumer's direct deposit to the one or more the plurality of existing prepaid card accounts, the reduced available credit adapted to be drawn in at least one of the plurality of separate predetermined loan increments.

19. A computer-implemented method as defined in 15, wherein each of the one of the plurality of loan repayment portions are equal in value; wherein determining eligibility for the line of credit further includes requiring a minimum age and a government screening process; and wherein the financial institution is a federally chartered bank and the line of credit is a bank product.

20. A computer-implemented method as defined in 14, the method further comprising canceling a draw from the line of credit account through a call to a customer service center; and wherein the one of the plurality of loan repayment portions are deducted from the directed deposit prior to the direct deposit funds being made available to the consumer.

* * * * *

UNITED STATES PATENT AND TRADEMARK OFFICE
CERTIFICATE OF CORRECTION

PATENT NO.        : 8,108,279 B2
APPLICATION NO.   : 12/338712
DATED             : January 31, 2012
INVENTOR(S)       : Scott Galit and Trent Sorbe Page 1 of 1

It is certified that error appears in the above-identified patent and that said Letters Patent is hereby corrected as shown below:

Abstract, Line 13, please replace "father" with "further".

Specification, Column 3, Line 21, please replace "consumers" with "consumer's".

Specification, Column 5, Line 29, please replace "consumers" with "consumer's".

Specification, Column 5, Line 38, please replace "father" with "further".

Specification, Column 5, Line 43, please replace "consumers" with "consumer's".

Specification, Column 10, Line 66, please replace "APT" with "API".

Specification, Column 11, Line 24, please replace "finds" with "funds".

Specification, Column 11, Line 26, please replace "fall" with "full".

Specification, Column 11, Line 35, please insert --,-- after "for example".

Specification, Column 11, Line 63, please replace "finds" with "funds".

Specification, Column 12, Line 48, please replace "fierier" with "further".

Specification, Column 13, Line 15, please replace "finds" with "funds".

Specification, Column 14, Line 59, please replace "finds" with "funds".

Signed and Sealed this
Twenty-seventh Day of March, 2012

David J. Kappos
*Director of the United States Patent and Trademark Office*